US012118375B2

(12) United States Patent
Abbott et al.

(10) Patent No.: US 12,118,375 B2
(45) Date of Patent: *Oct. 15, 2024

(54) SYSTEM AND METHODS FOR IMPROVED ADOPTION OF CLOUD CONTAINER PROFILES

(71) Applicant: ROYAL BANK OF CANADA, Toronto (CA)

(72) Inventors: Jacob Abbott, Jersey City, NJ (US); James Beck, Jersey City, NJ (US); Jacquelyn Du, Jersey City, NJ (US)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,656

(22) Filed: Jul. 11, 2023

(65) Prior Publication Data
US 2024/0061695 A1    Feb. 22, 2024

Related U.S. Application Data

(63) Continuation of application No. 16/541,996, filed on Aug. 15, 2019, now Pat. No. 11,698,803.

(60) Provisional application No. 62/764,683, filed on Aug. 15, 2018.

(51) Int. Cl.
*G06F 9/455*   (2018.01)
*G06F 16/22*   (2019.01)

(52) U.S. Cl.
CPC ...... *G06F 9/45533* (2013.01); *G06F 16/2228* (2019.01)

(58) Field of Classification Search
CPC .. G06F 9/45533; G06F 16/2228; G06F 9/455; G06N 20/00
See application file for complete search history.

(56) References Cited

U.S. PATENT DOCUMENTS

| 2015/0347093 | A1* | 12/2015 | Dowd | G06F 8/71 717/101 |
| 2019/0149617 | A1* | 5/2019 | Gao | H04L 67/34 709/223 |
| 2020/0034167 | A1* | 1/2020 | Parthasarathy | G06F 9/45558 |

OTHER PUBLICATIONS

United States Patent & Trademark Office (USPTO), Non Final Rejection issued to U.S. Appl. No. 16/541,996, filed Mar. 24, 2022.
(Continued)

*Primary Examiner* — Jorge A Chu Joy-Davila
(74) *Attorney, Agent, or Firm* — Norton Rose Fulbright Canada LLP

(57) ABSTRACT

System and methods providing for categorizing individual virtual machines, as well as the associated application that they form by working in concert, into groups based on the feasibility of hosting the processes that occur on a virtual machine within a container, as well as the relative difficulty of doing so on a virtual machine and application level. The data used to create these scores is collected from the individual machines, at regular intervals through the use of an automated scoring engine that collects and aggregates the data. Said data is then analyzed by the system, that with the aid of passed in configuration data, is configured to generate the scores to allows for an educated and focused effort to migrate from hosting applications on virtual machines to hosting applications on containers.

15 Claims, 24 Drawing Sheets

(56) References Cited

OTHER PUBLICATIONS

United States Patent & Trademark Office (USPTO), Final Rejection issued to U.S. Appl. No. 16/541,996, filed Jul. 14, 2022.
Form PTO/SB/08a.
Form PTO-892 related to U.S. Appl. No. 16/541,996, which was part of paper dated Feb. 15, 2023 (1 page).
Form PTO/SB/08a filed in U.S. Appl. No. 16/541,996 on Feb. 9, 2023 approved by Examiner (4 pages).
Form PTO-892 related to U.S. Appl. No. 16/541,996, which was part of paper dated Jul. 8, 2022 (1 page).
Form PTO-892 related to U.S. Appl. No. 16/541,996, which was part of paper dated Mar. 16, 2022 (1 page).

* cited by examiner

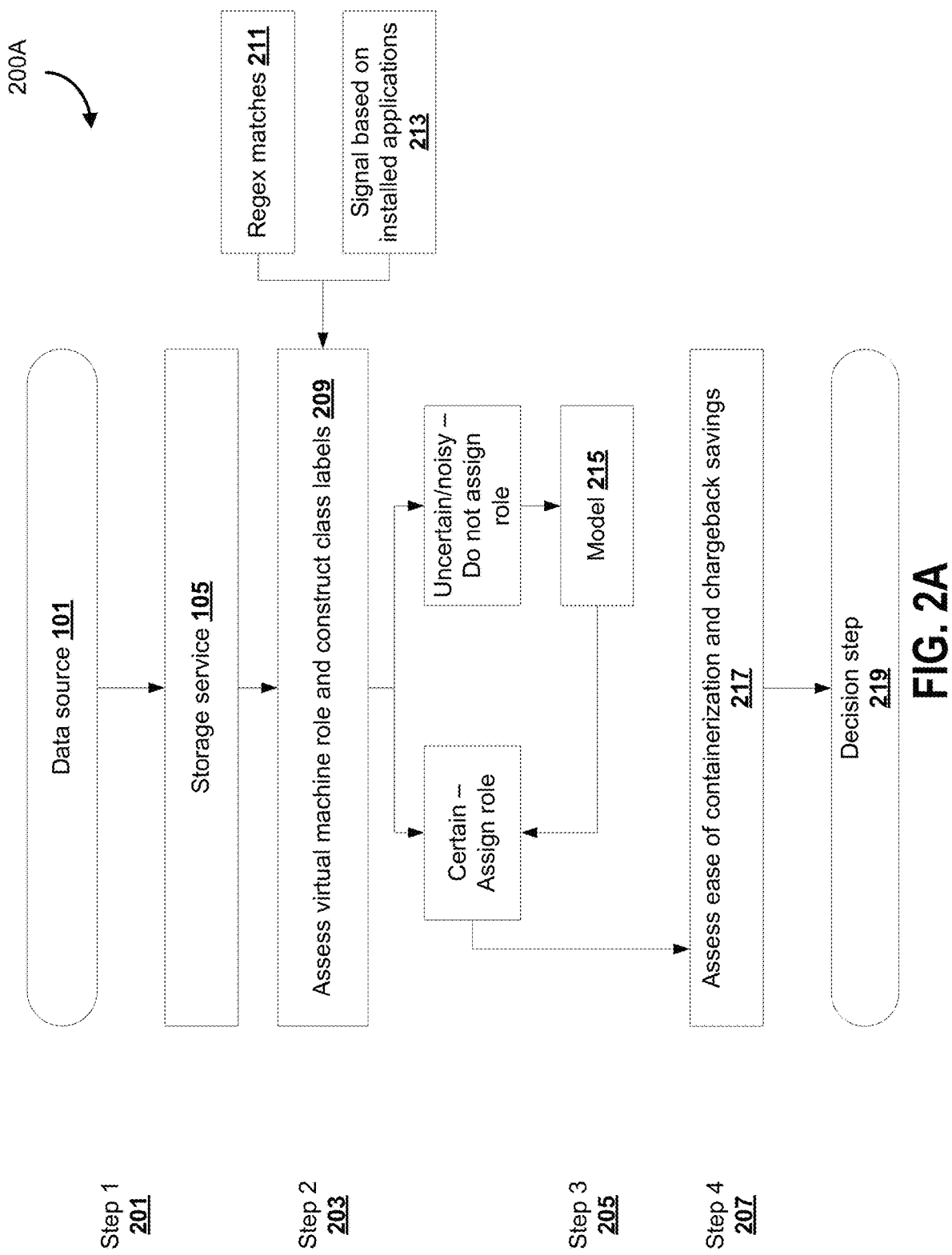

SYSTEM AND METHODS FOR IMPROVED ADOPTION OF CLOUD CONTAINER PROFILES

CROSS-REFERENCE TO RELATED APPLICATIONS

This application is a Continuation of U.S. application Ser. No. 16/541,996 filed on Aug. 15, 2019, entitled SYSTEM AND METHODS FOR IMPROVED ADOPTION OF CLOUD CONTAINER PROFILES, which is a non-provisional of, and claims all benefit, including priority to, U.S. Application No. 62/764,683, entitled "SYSTEM AND METHODS FOR IMPROVED ADOPTION OF CLOUD CONTAINER PROFILES", filed on 2018 Aug. 15, incorporated herein by reference in its entirety.

FIELD

This present disclosure relates to the field of virtual computing, and in particular, a platform for detecting virtual machines whose roles within the architecture of an application are suitable candidates for restructuring and replacement with a container.

INTRODUCTION

Virtual machine servers, also known as virtual computing platforms, are servers that host multiple virtual machines, which operate as their own distinct computing platform, despite being a microcosm of a larger server. This allows for one, larger server to be split into multiple smaller virtual machines, allowing one piece of hardware to have multiple, unique instances of operating systems and software running on it at once. This is made possible by allocating the physical resources available to the server (CPU cores, RAM memory, and disk data storage) to each respective virtual machine it is hosting, through the use of virtualization technology that enforces the specified division within resources upon the virtual machines.

A container, on the other hand, is a single instance of software and its related dependencies, allowing the contents of the container to run dependent purely on itself. The container "unit", does not include hardware in its definition; this is done intentionally. A container can be hosted on any physical machine, as the self-dependent container can run identically on different hosts, making it platform agnostic.

Containers are managed by over-arching software, ensuring that containers get access to the necessary physical hardware they need to perform their tasks, dynamically allocating physical hardware from a shared pool in order to meet the rise and fall of demand placed upon the application running within the container.

SUMMARY

Virtual machines are currently the preferred method of technological computing; one virtual machine server hosts multiple virtual machines, allowing various different operating systems and instances of software run simultaneously on a single server, negating the need to purchase and maintain the individual smaller virtual machines.

In order to prevent the actions of one of these smaller virtual machines from negatively impacting the other virtual machines hosted on the virtual machine server, the virtual machine server enforces specific divisions within the resources the server has to offer to the virtual machines it is hosting: CPU cores, RAM memory, and disk data storage.

This precautionary measure means that the actions of one virtual machine will not impact the others; a fatal error in one virtual machine will not cause the other virtual machines hosted on the same virtual server fatally end. To do this, each virtual machine is given a finite set of resources by the virtual server host.

By having individual ownership of these resources, each virtual machine operates in a vacuum, unaware of the other virtual machines being hosted on the same virtual machine server. This means that a memory leak in one virtual machine on the server will not spread into the RAM memory of another machine, negatively impacting its ability to perform its tasks.

However, operating inside this vacuum poses problems when the virtual machines deviates from optimal performance, becoming under-utilized or over-utilized. In the case of under-utilization, a virtual machine experiences a glut of resources. It is assigned more resources than it has a need for, and performs poorly, as it is not being given the workload it is meant to carry.

This wasteful abundance of physical hardware directly correlates to higher costs; the cost of acquiring the physical hardware, and the cost of maintaining unused physical hardware. In the case of over-utilization, a virtual machine is consistently operating at maximum capacity, performing poorly as it lacks the resources it needs to perform its functions in a timely manner. This wasted time and increased rate of depreciation (and thus shorter lifespan of the physical hardware) also carries an associated cost.

In an ideal scenario, the virtual machines that under-utilize their resources would be able to relinquish their unused physical hardware, so that the over-utilized virtual machines would be able to consume the unused physical hardware, and be better equipped to handle their workload. Thanks to containers, this is now possible.

Container managing software supports the dynamic allocation of resources, preventing the previously mentioned problem from occurring by only providing the container the amount of resources that it requires at that point in time, made possible due to the containers self-contained design. This allows for reduced operating costs due to the elimination of dormant physical hardware, as well as reduced overhead costs by negating the need to purchase excessive amounts of physical hardware. By staying on the forefront of technology, the problems posed by virtual machines can be erased. The cost savings are appealing at an infrastructure level, and the technical benefits are appealing at the developer level. Containers are easy to scale for high loads, and easy to scale down when not in use. They are incredibly robust in that no particular machine or container is important. They can be spun up and down as necessary as long as their data sources are still available.

The benefits are clear, but the difficulty of designing container friendly software and the difficulty of moving existing software to a container base can often be preventative to large scale migrations. There are specific technical challenges in refactoring an application to run on containers instead of virtual machines, and significant computing resources are required to conduct the transaction.

Not all applications can be run on containers, and if the application is physically able to be run on containers, that may only apply to a portion of the application. Depending on the amount of physical hardware consumed by the application, it may even lead to higher operating costs.

Identifying applications that are good candidates for conversion/transition to containers is a difficult determination in view of the voluminous amounts of usage information to be processed, especially for a large footprint implementation (e.g., tens of thousands of virtual machines hosted across a number of data centers). As applications are used differently and under different loads, and various computational resources become available as container host devices, the ease of containerization can vary at different time periods or under different usage/availability contexts.

Usually, an all or nothing approach is taken; either containers are adopted with open arms, and all applications are slated to be containerized, or containers are regarded as too difficult and ignored. Picking the forerunner applications to be containerized is usually done via a process of random selection or on a volunteer basis. The people performing the conversion, whether it be the owners of the application or a specific team whose role it is to containerize applications, learns how to perform the conversion via a hands on approach as they work. This means that estimates for man hours, project deadlines, and the difficulty of each conversion cannot be provided upfront.

This is a problem that the system described in some embodiments herein is adapted to provide a technical, practical solution for. The system automatically or periodically generates estimated ease of container-ability transition metrics, which are adapted to allowing users to take the first step towards containerization, and be able to make an informed decision in regards to which applications and virtual machines to containerize, which applications and virtual machines to disregard due to their elevated operating cost, and which applications and virtual machines should be containerized first, due to their increased savings and the ease of the conversion.

The approach helps to achieve the technical benefits offered by containers by providing accurate information on a consistent basis, via the use of periodically (e.g., daily) automatically generated reports. With these reports, educated decisions can be made on behalf of the users, allowing them to overcome the steep learning curve within the container computing field, and preventing adoption pitfalls.

By collecting machine data on every virtual machine within an application, the system is able to parse this information automatically to infer a virtual machine's role in the system architecture of the application by parsing through data sets representative of the installed software, running processes, the operating system, and other information collected from the machine. With that in mind, the system is configured to determine if the contents of the virtual machine could be run inside of a container, and if a container would suit the role that the virtual machine previously had filled. Of the virtual machines that can be converted to containers, the system can be adapted to assign an "Ease of Containerization" (EoC) score (e.g., a value from 1-5, with a score of 5 indicating the virtual machine will be relatively easy to containerize, and a score of 1 indicating that the virtual machine will be relatively difficult to containerize). Virtual machines that cannot be containerized can be assigned a score of 0.

The ease of containerization can be encapsulated as a data field value that is an output from the system to a downstream mechanism for prioritizing and/or implementing virtual machine to container transitions. Such transitions can be conducted, for example, by a downstream server mechanisms and may include allocating or assigning container devices for use for containers that have filesystem similarities and/or other shared resource advantages. Alongside this EoC score, the physical hardware consumption of each virtual machine is collected and analyzed to determine the current cost of running that virtual machine, and an estimate of the operating cost for an identical container is determined, as not all virtual machines that can be containerized logically make sense to do so. These values may also be stored or encapsulated in corresponding data structures that are adapted for output for consumption or further processing by downstream systems.

After all virtual machines have been scored and assigned, the total, application level Ease of Containerization and estimated container operating cost is calculated.

Equipped with this score and cost estimates, users have the ability to make informed and educated decisions as to which applications to convert to run on containers and how much money is to be expected to be saved by doing so. This allows users to achieve the greatest savings early on by containerizing the low hanging fruit; applications that offer both high savings, and a high ease of containerization. It also allows users to not waste time and effort attempting to containerize applications that physically cannot be containerized, or applications that should not be containerized due to the increased operating costs. By knowing where to start the containerization process, users can gain hands on experience containerizing easy to containerizing applications, and learn the ins and outs of containerization on easy applications before moving towards more difficult ones. Thanks to this solution, the full benefits of containerization can be reaped.

As described in various embodiments, systems and methods for transitioning applications from virtual machine implementations to container-based implementations are provided.

Determining which applications currently hosted by virtual machine implementations are candidates for transitioning to container-based implementations can be a technically challenging process, and automated mechanisms for identifying a subset of candidate virtual machine computing instances for transition into container-based computing instances from a set of virtual machine computing instances are provided.

Data sets representing (i) characteristics of operation of each of virtual machine computing instance of the set of virtual machine computing instances, the data sets including at least one of processor usage, memory usage, or network usage, and (ii) appcode of each virtual machine computing instance are received, and processed to output a metric representative of a relative ease of containerization for each virtual machine computing instance, the metrics stored on a data structure identifying the subset of candidate virtual machine computing instances determined based on the virtual machine computing instances having a metric greater than a predefined threshold.

The mechanisms can further include segmenting the subset of candidate virtual machine computing instances into container groups each corresponding to container devices, each container device having a shared operating system shared across all containers associated with the container group hosted by the container device. The segments can be based on availability of resources that would be allocated as between the different containers and compatibilities between container device infrastructure and the containers assigned thereof (e.g., file system compatibilities, operating system compatibilities). The data structure can be processed by a downstream computing device to generate a set of control signals to be transmitted to the container devices or to virtual machines (or both) for transitioning the subset of candidate virtual machine computing instances to be hosted on corresponding container devices based on the identified container groups.

The data structure can be adapted to store the data field representations of the subset of candidate virtual machine computing instances in a prioritized order based on a corresponding metric representative of a relative ease of containerization, the prioritized order.

The processing the data sets to output the metric representative of the relative ease of containerization for each virtual machine computing instance can, in a embodiment include using regular expression strings.

The processing the data sets to output the metric representative of the relative ease of containerization for each virtual machine computing instance can, in a variant embodiment, include using a machine learning data architecture configured to process the data sets using a maintained unsupervised machine learning model based at least on chargeback models representing cost savings.

The processing the data sets to output a metric representative of a relative ease of containerization for each virtual machine computing instance can, in some embodiments, include inferring a role of virtual machine based on the appcode of the virtual machine computing instance.

The transmitting of the control signals for transitioning the subset of candidate virtual machine computing instances can include provisioning the container devices and the corresponding shared operating systems, for example, spinning up or spinning down resources as required, including, for example, requisitioning specific container devices, installing shared resource images, and loading the applications as containers and loading any required libraries or executables (e.g., binaries).

The segmenting of the subset of candidate virtual machine computing instances into container groups each corresponding to container devices can be based at least on the inferred role of the corresponding candidate virtual machine instance determined based at least on the appcode of the corresponding candidate virtual machine instance.

The segmenting of the subset of candidate virtual machine computing instances into container groups each corresponding to container devices can also be based at least on an estimated resource requirement of the corresponding candidate virtual machine instance determined based at least on the appcode of the corresponding candidate virtual machine instance.

In some embodiments, an improved mechanism for coordinating transitioning of VM instances into container-based instances is described, that takes into consideration switching costs and suitability for transition. In a preferred embodiment, the mechanism is further configured to automatically initiate transitions of VM instances into container based instances, for example, by invoking backup, data transfer, resource allocation, microservices infrastructure initialization, and spin-down of virtual machine instances, among others.

Containers store and execute applications in resource-isolated processes. Structurally, containers are more lightweight than VMs and are compatible with the host OS, storing more applications than Virtual Machines and allowing for faster code deployment and execution by developers. Containers are scalable and may automatically resize based on usage. Thus, containers overcome inherent problems with infrastructure underutilization and inefficiency, otherwise present in VMs.

Despite these advantages, the adoption process of container platforms over VMs is slow. This bottleneck is primarily caused by a lack of a systematic method for identifying which applications make good candidates for containerization from a technological standpoint, and the inability to view the attached business value behind containerizing an application. Furthermore, while developers may be interested in understanding whether an app is containerizable and how the adoption process works within a company, this information is rarely available.

Embodiments described herein provide a technical solution to the technical problem identified above by introducing an unsupervised machine learning method that provides personalized cloud container adoption profiles for applications currently executed on Virtual Machines. This tool comprises of a system and methods of collecting data from several sources, such as MyOps™™, Tanium™, and vSight™™, via an API call, dumping said data into a cloud storage unit such as Elastic™ Cloud Enterprise™ (ECE) or another computer data storage unit, and analyzing it using a programming language, such as Python™.

The results are then pushed back through the cloud storage unit (e.g., ECE) to a front-end web server. Following aggregation of the data, the tool uses unsupervised machine learning to infer the "role" of each Virtual Machine within an appcode. A "role" refers to the type of work that is being done on a particular computer; each "role" tries to capture the machine's primary purpose. For example, a VM on which the Tomcat™ application is installed could be labeled with the role of "Tomcat", assuming the VM's primary function is the execution of the application Tomcat™

Using this inference and components of the aggregated data, the tool determines or heuristically approximates the relative ease of containerization for each appcode and potential cost savings of containerization (assessed using the chargeback models for Virtual Machines and containers). The cost savings and ease of containerization are used in tandem to provide a recommendation on whether an appcode should containerize. The front-end web server displays this result in a personalized format dependent on a user's login authentication information.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 2A is a block schematic diagram of a step-by-step approach to collecting and analyzing data by the tool, according to some embodiments.

FIG. 6 is a snippet of all of the running processes provided by Tanium™, stored within an Elastic™ index.

FIG. 11 is a screenshot of the UI, showing a table of all of the applications that exist within the virtual real estate, and the associated containerization data for each application.

FIG. 14 is a screenshot of the UI, showing a graph of the top 10 executives, organized by savings that could be achieved if the virtual machines that exist within applications they oversee that are capable of being containerized are converted to run on containers.

FIG. 17 is a screenshot of the UI, showing a table of all of the virtual machines overseen by the executive, and the associated container data.

DETAILED DESCRIPTION

Figure 1A:
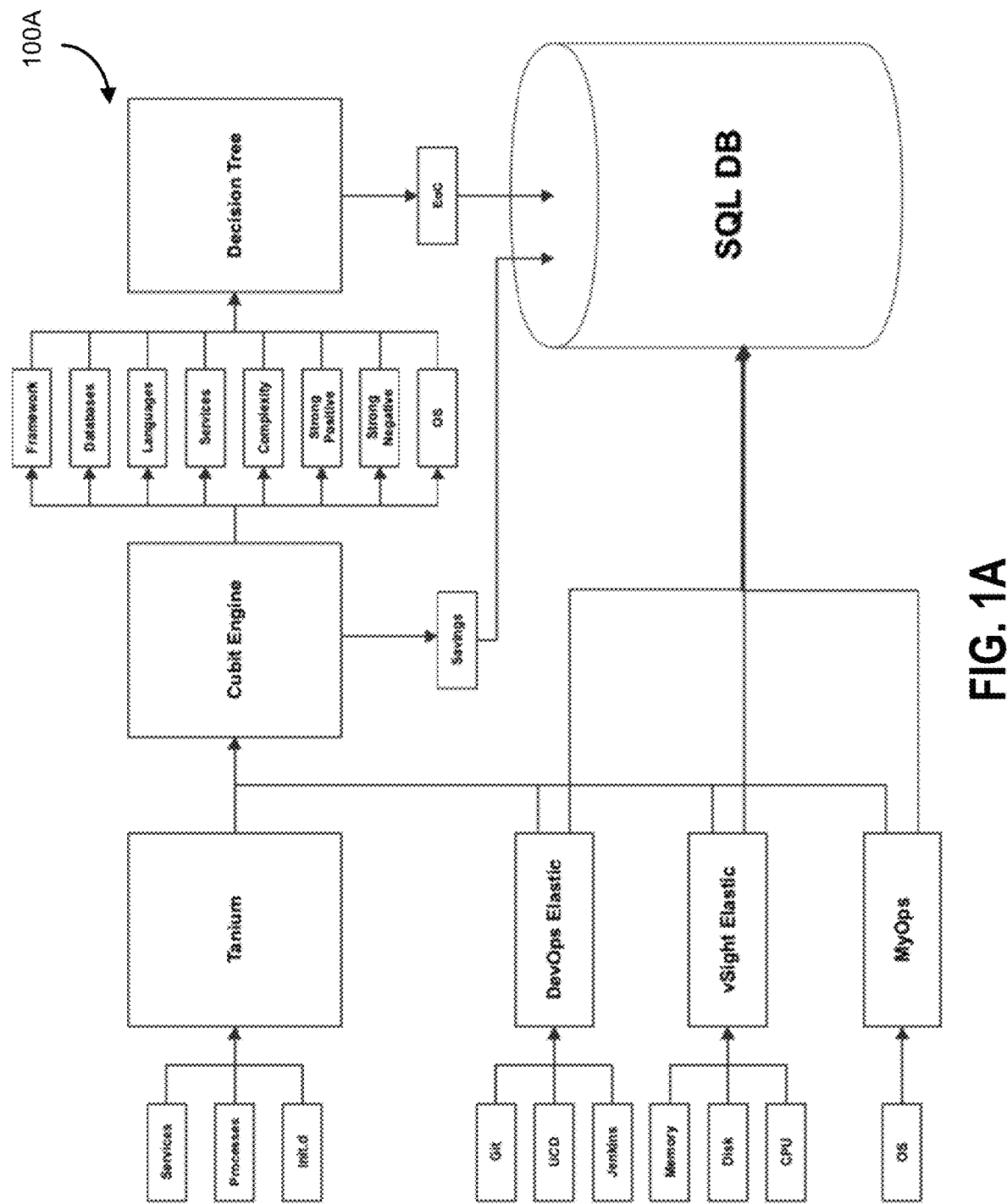
FIG. 1A is a block schematic diagram of an example tool that aggregates data from multiple sources and uses unsupervised machine learning to infer the role of each Virtual Machine within an appcode, according to some embodiments.

Virtual machines inherently suffer from under-utilization or over-utilization unless they are optimized, an unfortunate reality due to the discrete nature of the resource allocation within the virtual machine server.

This under-utilization and over-utilization results in both inefficient computing, and unnecessary expenses. While previous approaches have focused on rectifying this problem by resizing and optimizing virtual machines, this is a never-ending process, requiring either an automated solution or consistent manual upkeep to be performed across the entire virtual real estate.

The advent of container computing technology has usurped virtual machines as the preferred method of computing, allowing (in most cases) greater efficiency and lower cost by ensuring consistent, optimal performance without the need for regular manual upkeep. Containers have seen rapid adoption, as virtual machines are being decommissioned and containers are taking their place.

Containers store and execute applications in resource-isolated processes. Containers are superior to VMs for a number of reasons. Structurally, containers are more lightweight than the current technology of VMs, allowing code deployment and execution to be completed faster; therefore, developers can fix bugs and edit code quicker on containers than on VMs. Furthermore, each VM requires a separate guest OS to run, while containers are compatible with the host OS; a physical server can thus store more applications on containers than on VMs.

However, containers are not a one-size-fits-all solution; certain situations are better suited for containers, while others are better suited for virtual machines. Determining which situation calls for which method of computing is no small feat, and incorrect decisions carry the high price of wasted time and effort, or permanently increased operation costs.

The ability to notice these distinctions, and take the correct approach requires a computational approach that parses the technical monitored data sets to reconcile and analyze the data to make an informed and correct decision. Through the use of the solution described herein, an impartial approach can provide these informed decisions as to which method of computing is optimal to help reduce the potential for mistakes during the container adoption process automatically, faster and more accurately than can be done manually and at more frequent intervals.

Through the use of the solution as provided by the system of some embodiments, and intelligent and impartial mechanism can provide informed decisions as to which method of computing is optimal to prevent mistakes during the container adoption process. Unlike VMs, containers are also scalable and can automatically resize based on usage (for example, if an application is overloaded, the containers associated with the appcode will scale up, and vice versa).

This feature allows containers to circumvent the inherent problem present in VMs, namely infrastructure underutilization and inefficiency, and allows a company to create a dynamic chargeback model (for example, developers only using what they need and only paying for what they use). For corporations, transitioning to containers as the basis of their infrastructure is likely to result in structural efficiency and cost savings. Despite these advantages, the adoption process of container platforms over VMs is slow. This bottleneck is primarily caused by the lack of a systematic method for identifying which applications make good candidates for containerization from a technological standpoint, and the inability to view the attached business value behind containerizing an application. Furthermore, while developers may be interested in understanding whether an app is containerizable and how the adoption process works within a company, this information is rarely available.

Embodiments described herein provide a technical solution to the technical problem identified above by introducing an unsupervised machine learning method that provides personalized cloud container adoption profiles for applications currently run by Virtual Machines. The scoring mechanism described in some embodiments collects raw data from every virtual machine within virtual real estate, consisting of metric data, system services, running processes, OS information, and basic machine info. This information can be obtained through various approaches, including, for example, Tanium™, MyOps™, and vSight™.

Once a day, Tanium™ agents installed on every virtual machine within the entire virtual real estate check the system services and running processes, and dump all of that data into an Elastic™ instance. This raw data within Elastic™ is not kept historically, and is overwritten daily, as a new report is created every day to ensure that the reports are consistent and up to date.

This Elastic™ instance serves mainly as a pipeline and index method, and is pulled into the system daily via a Python-Elastic™ search client.

Upon being received, this raw data can be separated into five broad categories to allow for easier and faster analysis. Those five categories are Windows services, Windows processes, Linux Services, Linux processes, and Linux Init.d run services.

With the data pulled in, the contents of each Elastic™ document is mapped to its corresponding machine ID, and Elastic™ documents are grouped together according to their machine ID in order to make a complete list of all the machine's services and processes.

The data is then cross-referenced with the entire virtual real estate, provided by vSight™, in order to find the virtual machine that corresponds to the machine ID, and it's associated data. This is done by using the metadata provided by MyOps™ as a middleman to match the virtual ID within vSight™ with the machine ID from Tanium™. This step also allows for the aggregation of the MyOps™ metadata, creating an aggregated data object consisting of metadata from MyOps™, system services and running processes from Tanium™, and machine metrics from vSight™. However, this data object is a collection of raw data, that to the untrained eye is vital, but ultimately consists of redundant and non-vital data. The raw data must be cleaned and normalized in order to allow for faster and more accurate analysis. This done through the use of regex to translate the system services and running processes into a readable, uniform list, and then to sort out duplicates and remove data that is present within all virtual machines or has no bearing upon the virtual machines role within the application architecture.

Now that the data has been collected, normalized, and aggregated, the system can begin to score the virtual machine. This score relies on what the virtual machine is running, and how it is running these services and processes. To do this, the list of system services and running processes is compared to a list of pre-installed services and processes stored in an internal yaml configuration file.

The contents of this configuration file consist of pre-installed software and common background processes, allowing the mechanism to filter out irrelevant data that would serve no purpose other than to create noise within the data.

Filtering out the pre-installed software and background processes listed within the configuration file, the system is able to filter out the default system processes and pre installed services by using the total set of data to find the common denominators of each operating system. The system utilizes this list and a configuration file of prepared search matches, to parse out information about frameworks, applications, databases, and middleware.

In one variant, this data was also used for the ML classification of a machine as either an application server or as a dedicated database. Trained data from MyOps™ about whether a machine was built to be used as a database and its base process list allowed us to use supervised machine learning to predict unknown machines.

In some embodiments, database services can be parsed for in the running services, and machines can be classified as running a database server or not. This step enables us to see basics about a machine and assign a good base score if desired services are found, or a poor one if otherwise.

For instance, if a virtual machine is running Tomcat™, which is a common framework that is moved to containers, it would be assigned a good base score. On the other hand, if a virtual machine is only running SQL processes, it is indicative of serving as a database, which is not recommended to run on a container due to its heavy use of disk data storage. Thus, it would receive a poor score.

With a base score being assigned from the service information, the system can then observe how the machine is being used to see if it's more or less likely to be containerizable. The system observes a number of potential through the monitored data sets to provide insight in relation to containerization.

The system can check the operating system information to see if it's a recent OS, and whether or not it is an up to date version of that OS. Applications that require an older version are likely unmovable, and more up to date machines are more likely to be easier to move.

The system can also detect machines that have lower percent disk usages. Containers are supposed to be small and easy to spin up/down and application that require large amounts of disk space tend to be less compatible with containers. The system can also observe to see the timing of the machines CPU usage.

Machines that run batch jobs on a schedule tend to see some of the greatest benefits from moving to containers.

After all of the individual virtual machines have been scored, the application itself is ready to be scored. This score is determined by the scores of the virtual machines that consist of the application, and by analyzing the DevOps maturity of the application.

By pulling in data from another Elastic™ instance, the solution is configured to analyze whether the application uses DevOps tools associated with containers, specifically Git, Jenkins, and Urban Code Deploy. Applications that use these tools are more "mature", and thus easier to containerize.

Scores consist of a number between 0 and 5, with 0 meaning that the virtual machine or application cannot be converted to a container; this would include a database, or legacy applications running on antiquated code. A score between 1 and 5 indicates that the application can be containerized, with 5 being relatively easy to containerize, and 1 being relatively difficult to containerize.

As the landscape of the virtual real estate changes, the configuration file can be further modified in order to acknowledge or ignore running processes and system services that are or are not of interest, allowing the system to be dynamic and further refined to prioritize different features within its scoring mechanism.

Alongside the ease of containerization score, the current virtual machine operating cost, and estimated container operating cost are also generated from the machine metrics provided by vSight™, allowing the user to be presented with the estimated container savings alongside the ease of containerization.

This allows users to sort through applications for those with the greatest savings and ease of containerization, allowing for easy selection of prime candidates for containerization, as well as notifying users of which applications and virtual machines are not profitable to convert to containers, preventing wasted time and effort.

All of these features are presented to users through a web user interface, linked to the network to prevent users from having to create account at login. By logging in with their LanID, MyOps™ is searched for applications tied to the user's name, and grants them only access to those applications. This prevents the user from having access to data they are not meant to see, as well providing the convenience of having their applications right in front of them.

For users with higher permissions, the ability to sort through the data on a virtual machine level, application level, or executive level. This allows users to inspect individual virtual machines, or take a more holistic approach and inspect applications as a whole. If the user is an executive, they can easily sort by executive, and see all of the applications that they oversee, or are overseen by one of their team members, in order to take a top-down approach to identifying applications suitable for containerization.

In order to guarantee accurate scores and savings estimates, new data from every single virtual machine within the organization is retrieved, aggregated, cleaned, and analyzed over-night, ensuring that users will consistently have up-to-date and accurate reports first thing in the morning.

Although the raw data is not saved, the reports generated by the raw data are stored in a SQL database, to allow for historical reporting and to identify trends within the ease of containerization score of applications that can only be reaped by the consistent automated reporting.

Through the user interface, historic reports can be accessed, and all reports, both historic and current, can be downloaded for offline use.

Every virtual machine in the virtual real estate goes through four phases: data ingestion and cleaning, ease of containerization calculation, sizing recommendation, and pricing prediction. In order to better explain these four phases, a step by step walkthrough is provided using the virtual machine SE126147, one of the virtual machines that consists of the application C1U0.

Figure 3:
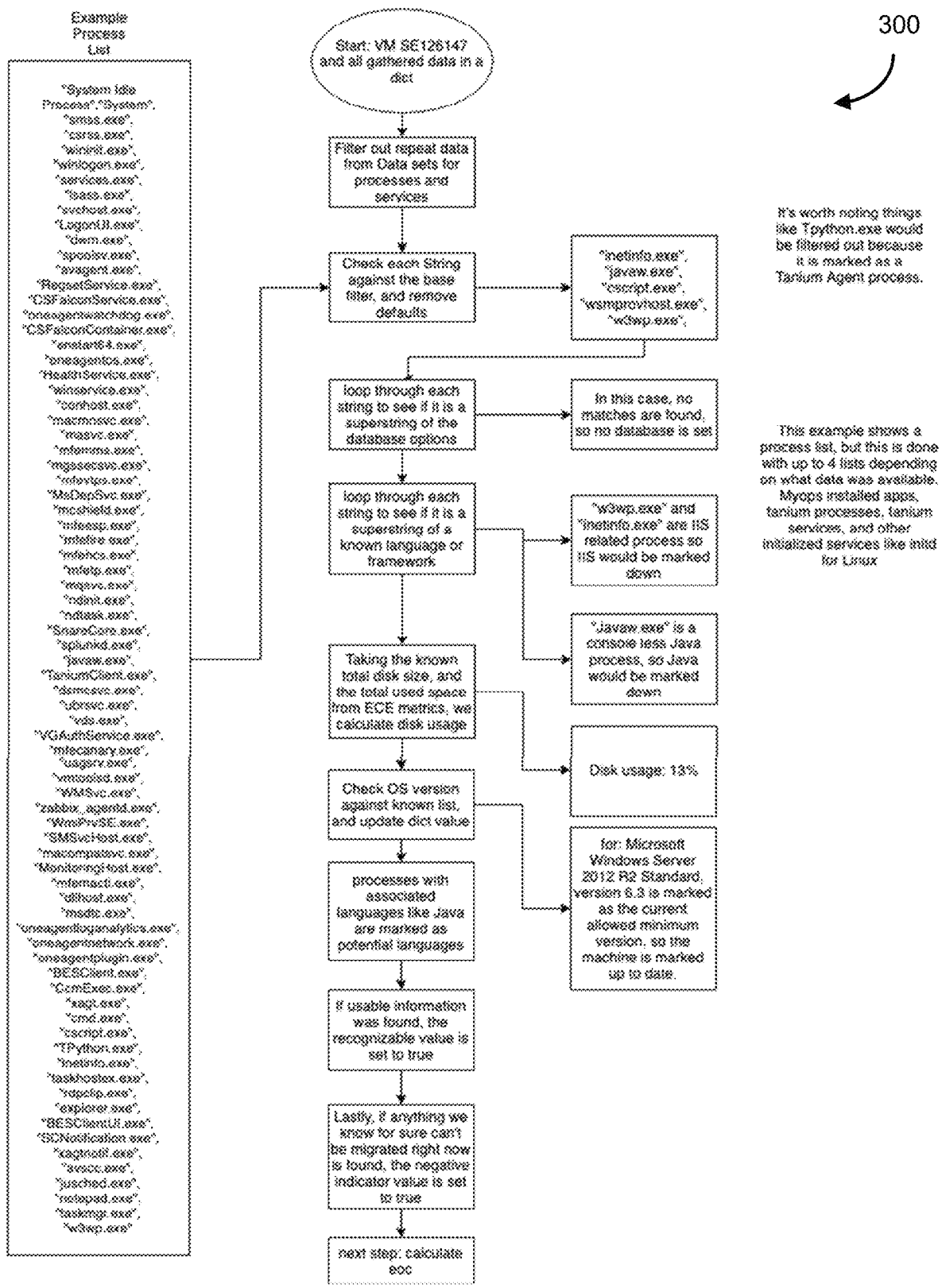
FIG. 3 is a low level walk through of the data ingestion process using the virtual machine SE126147 as an exemplar, according to some embodiments.

FIG. 3 provides a visual guide to this example.

The first step, data ingestion and cleaning, is a long and important phase, as without it, there would be no data for the other three phases to work with. In this phase, all available data is cleaned and sorted into easily identifiable assets, the majority of which coming from lists of strings and metrics.

Figure 7:
FIG. 7 is a snippet of all of the system services captured by Tanium™, stored within an Elastic™ index.

The lists of strings provided by Tanium™ are the first to be ingested and cleaned. These lists are the running processes (FIG. 6) and the system services (FIG. 7).

There are 80 recorded active processes, and 90 recorded active services for SE126147, but by applying the base filter, which contains lists of defaults and known agents and helpers for processes, applications, and services, these 170 strings can be shortened down to 11 strings of value. 6 of these are services (Application Host Helper Service, IBM UrbanCode Deploy Agent (ibm-urbancode-deploy-agent), IIS Admin Service, Web Deployment Agent Service, Message Queuing, Net.Msmq Listener Adapter), and 5 of these are processes (inetinfo.exe, javaw.exe, cscript.exe, wsmprovhost.exe, w3wp.exe).

The list is then parsed and cleaned via regex for: any words in parentheses, any fully numeric tokens, any architecture info (e.g., x86), any random strings of format e.g., kc46, any version strings (e.g., v6.0), any lonely dashes ("-"), or any version strings (e.g., 1.2.30). It also replaces whitespace and dashes with underscore (this is mostly for Mallet™) This is accomplished by splitting on certain tokens, and matching with a regex string such as '[( )]|^[a-zA-Z]+$|x\d{2}|kc\d{2}|\s-\s|v\d'.

Now this list can be compared to the configuration yaml file for matches.

First, databases are searched for, of which there are none. Then frameworks, languages, servers are searched for. Lastly, other miscellaneous services and processes are searched for. bm Urbancode deploy is identified as a match for "UrbanCode" and is classified as other. Javaw.exe, which is a no console java process, is identified as a match for "java". Lastly w3wp.exe, and IIS admin are marked as matches, and IIS is marked as a framework. All of these matches thus far are positive indicators for containerization.

Any matches are further checked for specifically desirable or undesirable matches, as per the configuration yaml file. For instance, if the cloud team is working with a lot of .Net based applications, that could be configured as a desired framework.

The virtual machine is then checked to see if it has an up to date version of its operating system. This virtual machine is running on Microsoft Windows Server 2012 R2 Standard, and is found to be matching the current minimum version number 6.3, so it is marked up-to-date.

Lastly, the virtual machine's disk usage is calculated to be 13% and its CPU usage is checked for anomalous or scheduled-job like use.

With the data ingestion and cleaning done, the virtual machine and its associated data is passed on to the next stage of ease of containerization scoring via the decision tree.

This machine would start with a base ease of containerization score of 3, because it has recognizable and containerizable components, and no databases. The frameworks, languages and other services are then checked for desirables, and the virtual machine would gain another point. It's up-to-date on software, has normal usage, and is only using 13% of its total allotted disk. This would earn it another point, bringing the total ease of containerization score up to 5.

Now that the virtual machine has received an ease of containerization score, a sizing recommendation is generated by further analyzing the virtual machine's physical hardware utilization, in order to generate an estimate of the equivalent amount of physical resources the container would use.

With a sizing recommendation, the mechanism is able to compute an estimated monthly operating cost for the container equivalent of the virtual machine. This virtual machine uses an average of 25% of its 4 vCPUs and 1.29 GB of memory monthly, which translates to roughly $34.20 if the virtual machine were to be run as a container within Openshift Cloud Platform™, a container hosting service.

With this process being repeated to all virtual machines that consist of C1U0, the overall ease of containerization score for the application of C1U0 can be generated. By taking an average of all of the virtual machine ease of containerization scores within C1U0, the system can provide it a preliminary score of 3. However, upon further inspection, it is noted that C1U0 uses the DevOps tools Git, Jenkins, and Urban Code Deploy; information gleaned upon individual inspection of every virtual machine within the application. With this information coming to light, the overall application ease of containerization score is increased to 4.

In order to provide a sanity check, a user can manually read the official description of the application provided on the page. According to this, C1U0 is reads "UI Will be on this platform, hence security/Access, Source code Mgt, certificate mgt will be separate than Window Services This will be a UI based application written in Java script hosted on RBC's internal Bluemix infrastructure. The UI will be making calls to internal .NET web services for data from various Wealth Management systems. It will connect to various datasources through common web services. this application will be accessed through the internet." This validates that C1U0 is likely a web server serving either .Net or Javascript, likely via IIS. Bluemix is a cloud offering at RBC, meaning that this is a solution already at least partly based in the cloud, and would be a good candidate for migration.

In a variant embodiment, machine learning mechanisms are described. This machine learning approach consume training data, consisting of the system services and running processes of currently existing virtual machines and the role of the virtual machine. By training the machine learning algorithm upon this data, it is configured to notice correlations between system services and running processes and role of the virtual machine within the application's infrastructure, allowing for better classification of virtual machine, most notably when the virtual machine is lacking in data.

This will allow the system to reduce the number of false negatives we provide; when data is lacking, the assumption is that the machine is not containerizable, as more damage is done with a false positive scoring than with a false negative scoring. By providing less false negatives, more virtual machines will accurately be listed as being able to be converted to containers, and overall savings will increase.

Machine learning will also be implemented to provide increased accuracy in regards to the ease of containerization scores. Relying on feedback from the containerization process, this machine learning algorithm will train on the initial ease of containerization scores of virtual machines, the system services and running processes, the ease of containerization scores of applications, another ease of containerization score provided after the conversion, and the man-hours necessary to complete the conversion, in order to notice trends between system services and running processes and ease of containerization scores and the required time it takes to complete a conversion.

In contrast to the previous mentioned machine learning, which is used to identify virtual machines with little data present that can be containerized, this machine learning algorithm will be used to identify correlations between system services and running processes and the actual ease of containerization reported by users performing the container conversions. This acts as a second sieve, adjusting the associated weights within the scoring algorithm, increasing or decreasing the importance of data points within the virtual machine in regards to the scoring algorithm. It will also be able to provide the time estimate for the conversion of each virtual machine and application, allowing application owners to know exactly how long their service will be down for while it is converted to run on containers, and how many man-hours it will take to perform that conversion.

Machine learning can also be used to find common denominators across system services and running processes to find entries that are missing from the configuration file. This will help to find red herrings within the system services and running processes that have no bearing on the virtual machines score, and thus should be ignored, as well as unique data points that should be taken into account within the ease of containerization scoring process, but are not because they are missing from the configuration file. This extra machine learning step will reduce noise within the data, in turn further streamlining the ease of containerization scoring process as well as providing more accurate ease of containerization scores.

Currently, the web user interface is the primary method of notifying application owners and the container adoption team of virtual machines and applications that should be converted to run on containers. However, this method relies on users checking the web user interface regularly to stay thoroughly informed. With automated notifications, application custodians and organization owners can be regularly informed on the suitability of their application for conversion to run on containers. This will further educate users about the usefulness of containers, and will promote container adoption in a bottom-up approach by notifying the users via email or in-application notifications of the potential savings for the application. By inspecting an application's DevOps maturity, the system can provide generate recommendations to applications, through the web user interface or through automated notifications, of possible. next steps to take in order to improve the application's overall ease of containerization score, and thus prepare for the containerization process. As more data is gathered through conversions to containers, the recommendations will become more thorough and more accurate as more and more red flags and best methods are identified.

FIG. 1A is a data flow diagram 100A, detailing the origin of the data the system uses, as well as the resulting new data that is generated by the system and where it is stored.

In this example, Tanium™ is pulling system services and running processes from three locations within each virtual machine and feeds it into out mechanism.

The system also pulls data from various sources, and after cleaning it, provides it to the decision tree to generate an ease of containerization score. Some of the data pulled in, as well as the generated data (ease of containerization and savings) are stored historically.

Figure 1B:
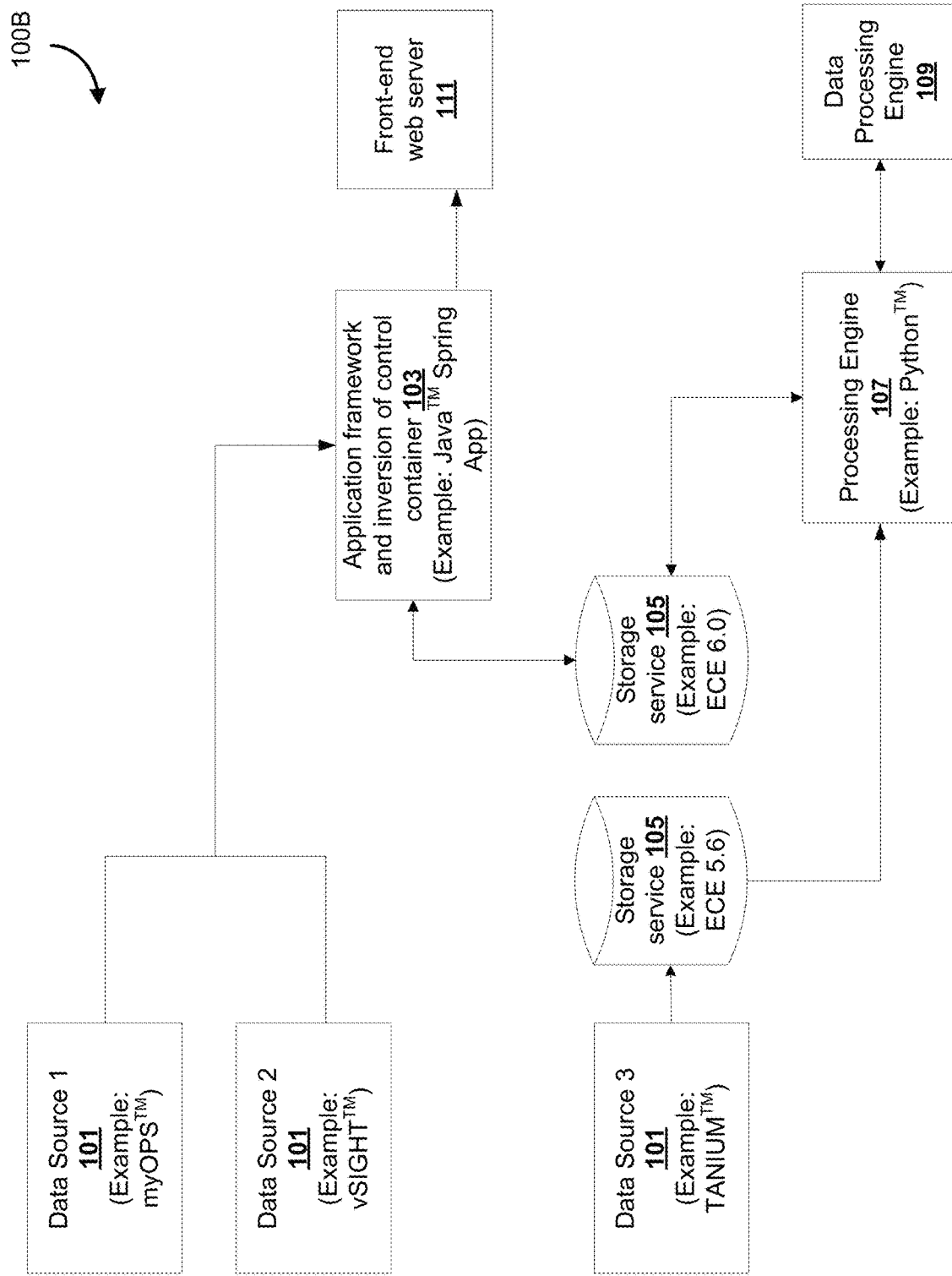
FIG. 1B is a block schematic of an example system, according to some embodiments.

FIG. 1B is a block schematic diagram 100B of an example tool that aggregates data from multiple data sources 101 and uses unsupervised machine learning to infer the role of each Virtual Machine within an appcode, according to some embodiments.

In some embodiments, data may be pulled from multiple data sources 101. For example purposes only, FIG. 1 depicts data being drawn from three data sources 101, namely: MyOps™™, Tanium™, vSight™™. An API call may be executed to pull data from data sources 101 such as MyOps™c™ and Tanium™ into an application framework and inversion of control container 103 such as Java Spring App™, and then into a storage service 105, such as a cloud storage unit like ECE version 6.0, or another computer data storage service. Data is pulled simultaneously from a second data source 101 such as an asset management service like Tanium™, and directly dumped into a second storage service 105, such as ECE version 5.6. From the ECEs, data is pulled by API call into a programming software 107 such as Python™, along with additional data analysis collected from an integrated IT portfolio management (IIPM) software.

Data processing 109 is conducted using a programming language such as Python™, and the results are pushed back through the ECE version 6.0 and Java Spring App™ to a front-end web server 111.

In some embodiments, the data sources 101 such as the asset management service (like Tanium™) provide a wealth of information on what applications are installed and running on each computer in a company network.

In some embodiments, the IIPM is a comprehensive, albeit frequently out-of-date catalogue comprising of the programming languages and databases that each development team in a company (identified by an "appcode") utilizes. The database does not provide information at the VM level.

Using this inference and components of the aggregated data, the tool calculates the relative ease of containerization for each appcode and potential cost savings of containerization using the chargeback models for Virtual Machines and containers.

FIG. 2A is a block schematic diagram 200A of a step-by-step approach to collecting and analyzing data by the tool, according to some embodiments.

In some embodiments, the application feature space is recursively partitioned into "certain" and "uncertain" nodes based on the VM's potential role, derived as described below. Those applications that fall under "certain" nodes are labelled with the class role corresponding to that node, and these VMs are set aside for the rest of the analysis.

At step 1 201, the tool collects data on applications used by each VM from a data source 101 such as asset management system like Tanium™, along with a comprehensive list of the applications installed on each VM, for storage on a storage service 105.

In some embodiments, application-specific usage statistics are collected (for example, the number of hours that an application was executed over the past month). The usage statistics are leveraged where available because they allow for the ranking of applications by usage and inform the removal of applications that are not frequently used from further analysis.

At step 2 203, the tool automatically assesses a VM's role (i.e. primary purpose) and constructs class labels 209 using regex matches 211. For example, if the tool is attempting to determine whether a machine is using the Python™ application, the tool will search for the pattern "python" in the list of installed applications. This search picks up substrings and approximate matches (e.g., "python" will match "utils_python").

In some embodiments, a VM's role may be signaled based on the installed applications 213. For example, a VM will typically not have the Tomcat™ application installed unless it is a Tomcat™ machine. These VMs are labeled accordingly based on this role, and dropped from subsequent analysis, where applicable.

At step 3 205, noisy class labels on "uncertain" VMs are used to train a model 215 that approximates the conditional distributions corresponding to each class. This is a multi-step process. First, regex matches are used to label a machine as a particular "role" (i.e. the machine's primary purpose; each "role" tries to capture the type of work that is being done on a particular computer) if it has an application installed corresponding to that role. These are "noisy" labels because a machine that has Java™ installed may not necessarily be using Java. Thus, nearly all VMs will have more than one label at the end of this step. This uncertainty underpins most of the difficulty in learning the VM role.

Next, a multi-label classification model is trained on the labelled list of VMs (specifically, a random forest) to learn the conditional distribution function over a reduced-dimension feature space. This is a multi-step process. For example, there may be over 15,000 unique installed applications, which would give the model far too many degrees of freedom and lead to poor predictive performance.

To address this issue prior to training, the model uses principal component analysis (PCA) for dimensionality reduction. The random forest model is trained choosing cv-optimal hyperparameters.

Lastly, the trained model is used to choose the most likely role for each VM in the "uncertain" group. If two roles are equally likely for a particular VM (within a particular tolerance), that VM is given two roles.

At step 4 207, in some embodiments, the ease of containerization is assessed 217 by weighing each data point on each application, and the result of this weighing is used to categorize an application as either easy, medium, or hard to containerize.

In some embodiments, the potential chargeback savings is also calculated using the current Virtual Machine chargeback model and the current cloud services chargeback model in order to assess differences between the current VM chargeback and the estimated containers chargeback (i.e. potential cost savings).

At the final decision step 219, the cost savings and ease of containerization are used in tandem to provide a recommendation on whether an appcode should containerize. The front-end web server 111 displays this result in a personalized format dependent on a user's login authentication information.

Figure 2B:
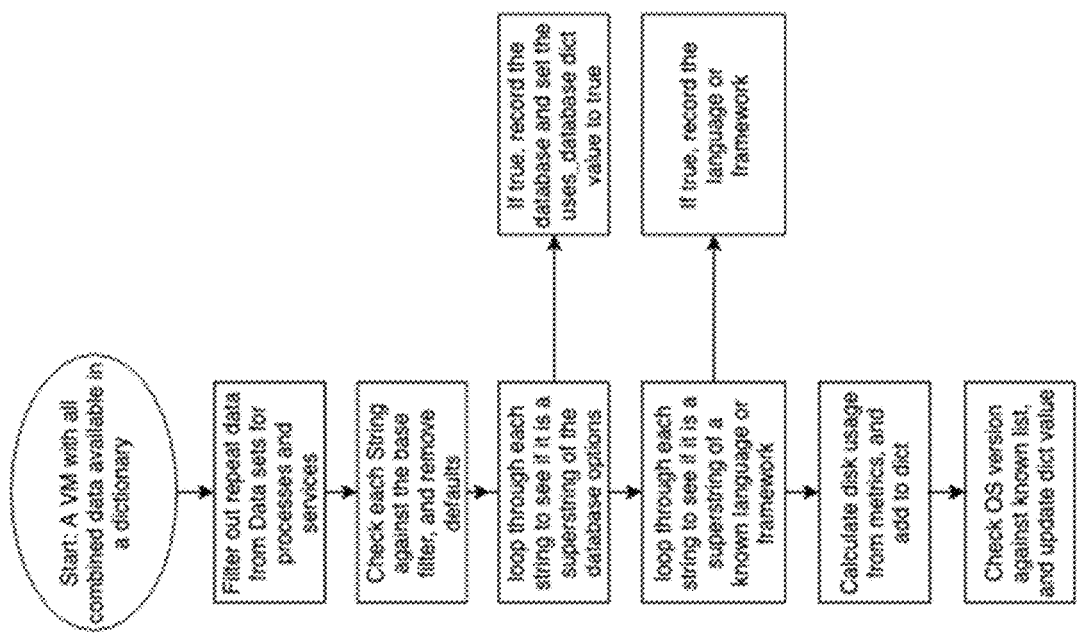
FIG. 2B is a diagram of the data ingestion process, according to some embodiments.

FIG. 2B is a high level diagram 200B of the data ingestion engine, which aggregates and cleans the data for further use, storing all of it in a dictionary of dictionaries.

Duplicate data is removed from the dictionary, and default services and processes are removed to reduce noise within the data. Matches are then searched for and recorded within the data object, setting flags to "true" in order to be used later within the scoring mechanism. Current hardware usage is recorded to generate sizing recommendations, and from that the estimated container operating cost. Lastly, the operating system and its version are recorded. Within the data ingestion process, large amounts of machine data from various sources are combined, cleaned, and analyzed in such a way to allow the virtual machine to be easily scored and savings to be determined.

FIG. 3 is an in-depth walk through process diagram 300 of the data ingestion process using the virtual machine SE 126147 as an example, corresponding to phase 1 of the previously mentioned example. The system services and running processes lists are combined into one, and duplicate entries are removed initially. A filter is applied to the combined list in order to remove trivial background services and processes that exist on most machines, and garner no insight into the true role of the virtual machine in question, leaving only insightful services and processes for the next step. The list is then compared to lists of known process belonging to databases, languages, and frameworks, in order to find matches between the lists, and set flags in a data object that is built off of this metadata in order to provide a uniform data object for the ease of containerization scoring algorithm. Metric usage data is recorded, as well as the operating system and its version are also recorded into this data object. Languages associated with each process is recorded as being present within the virtual machine. If usable information was found, it is noted, as the virtual machine has been inspected thoroughly enough to ensure an accurate score, and if any road blocks to containerization are found, a negative indicator flag is set to true; a sure sign that the virtual machine cannot be containerized. With the new data object having been built from the virtual machine's metadata, it is ready to be passed on to the ease of containerization scoring algorithm.

Figure 4:
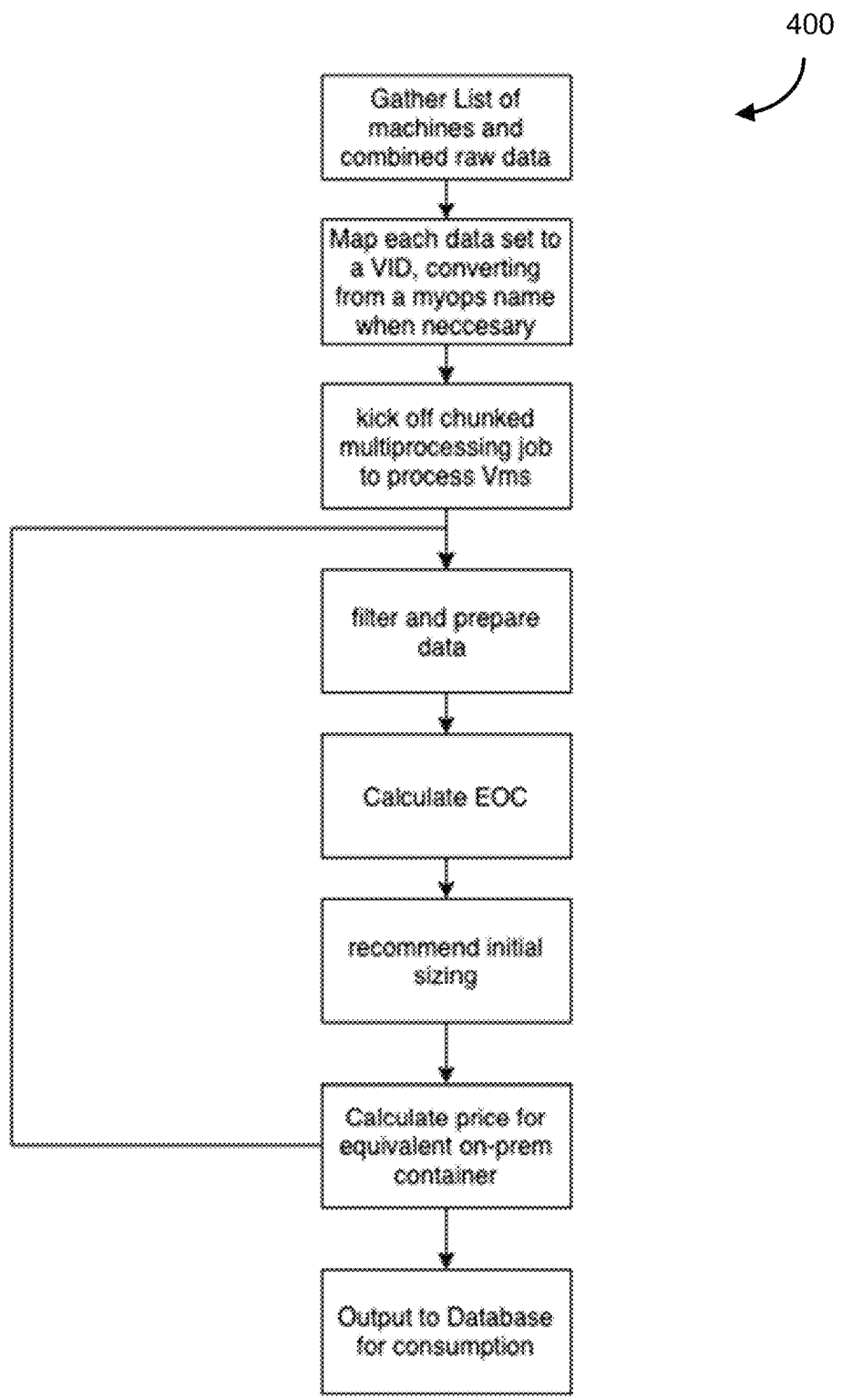
FIG. 4 is a high level diagram of an example back end of the system, according to some embodiments.

FIG. 4 is a diagram 400 of the back end processes within this application, showing the four phases: data ingestion and cleaning, ease of containerization calculation, sizing recommendation, and pricing prediction. These generated values from phases 2, 3, and 4 are then stored in a SQL database for historical reporting, while the raw data provided by Tanium™ is overwritten the next day.

Figure 5:
FIG. 5 is a snippet of an individual service provided by Tanium™, stored within an Elastic™ index.

FIG. 5 is a snippet diagram 500 of a single service provided by Tanium™, and stored within an Elastic™ index in order to pipe and index the data from Tanium™ to the system.

Figure 6:
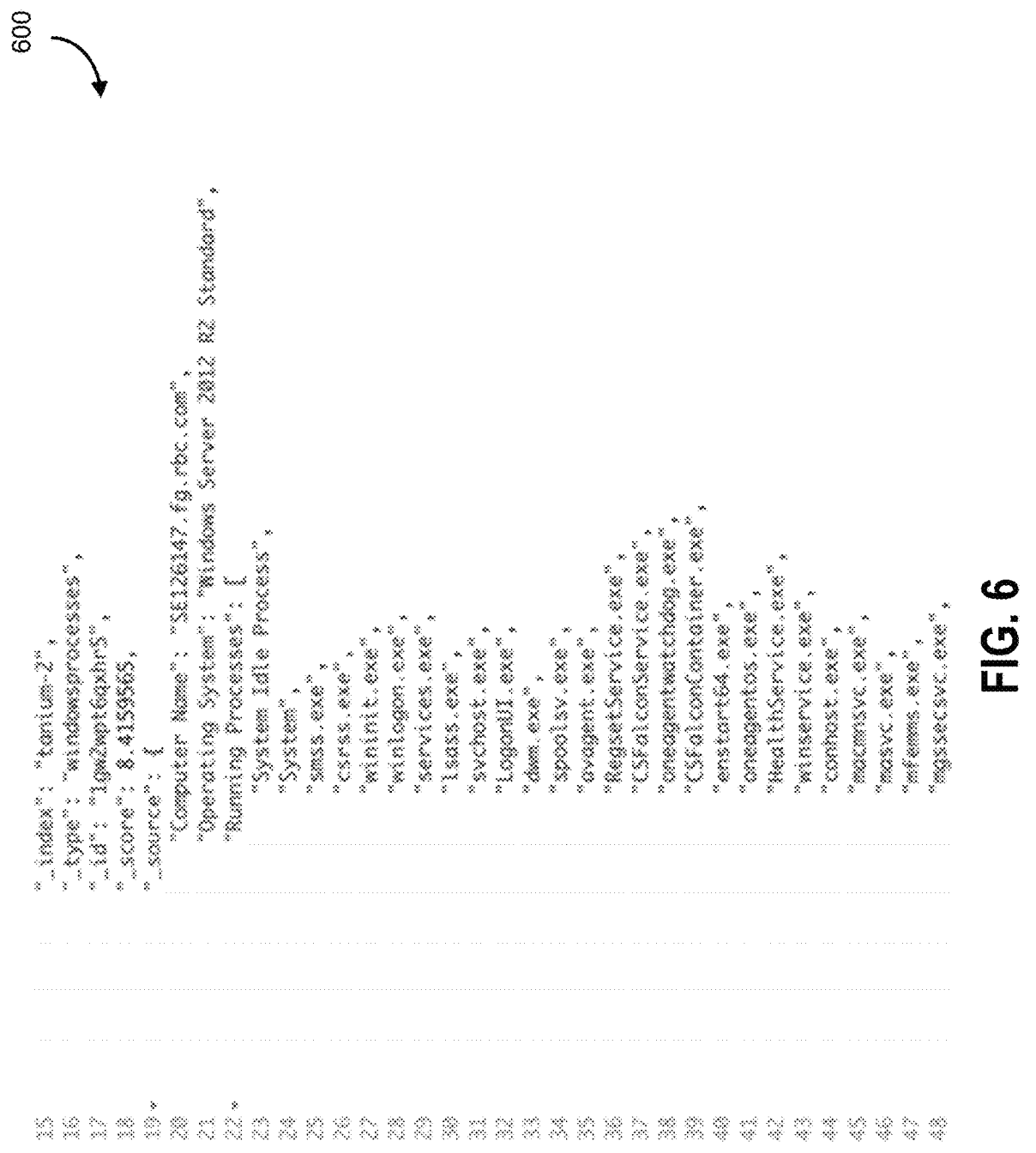

FIG. 6 is snippet diagram 600 of all of the running processes that exist on a virtual machine, provided by Tanium™ and stored within an Elastic™ index in order to pipe the data from Tanium™ to the system.

FIG. 7 is a snippet diagram 700 of all of the system services that exist on a virtual machine, provided by Tanium™ and stored within an Elastic™ index in order to pipe the data from Tanium™ to the system.

Figure 8:
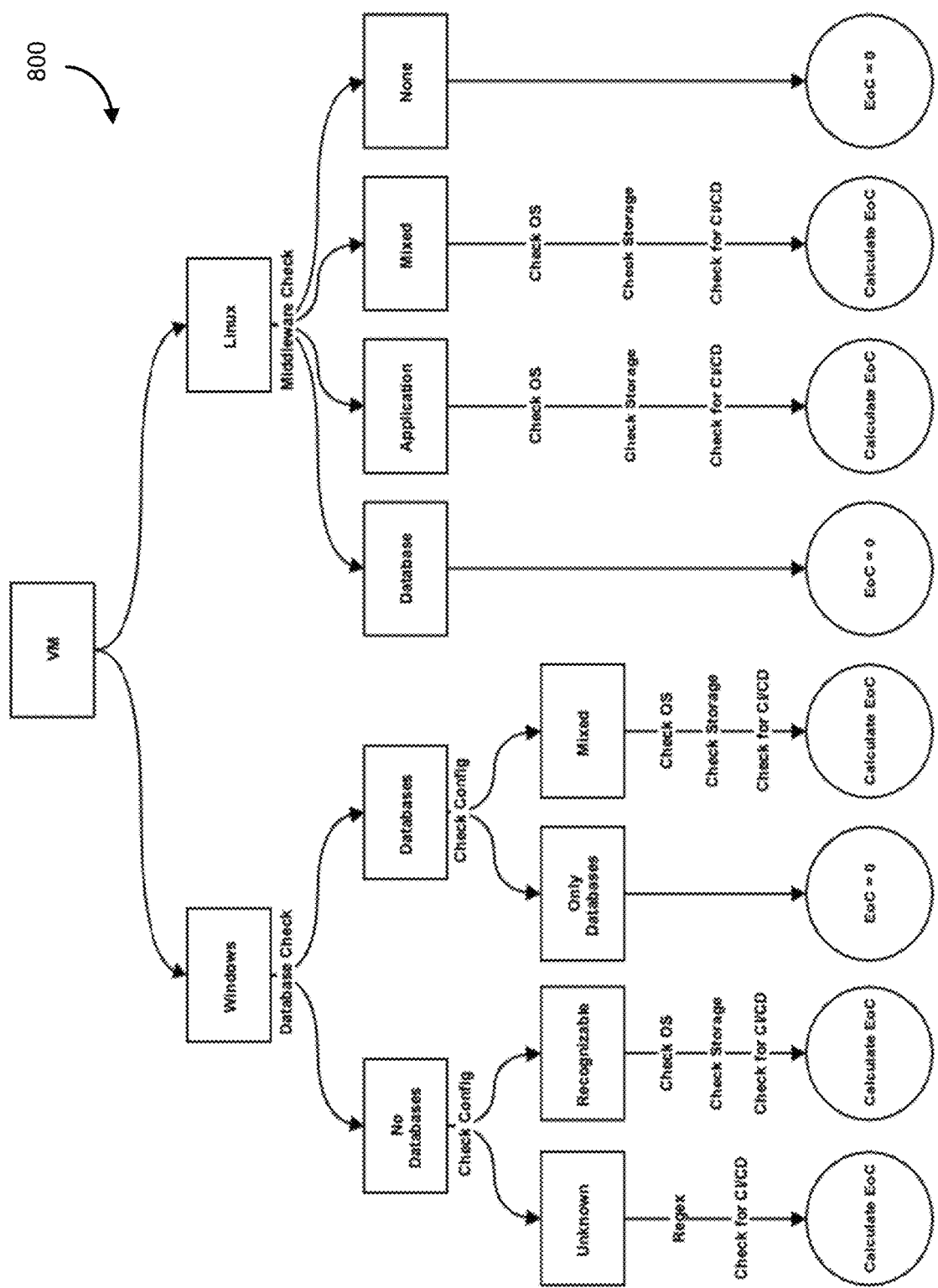
FIG. 8 is a diagram of the current state of a scoring mechanism, according to some embodiments. It is a decision tree that inspects the data associated to each virtual machine, and proceeds to inspect and score it based on the virtual machine's characteristics.

FIG. 8 is a diagram 800 depicting the current state of the ease of containerization scoring mechanism. by providing the ease of containerization scoring mechanism with a normalized and cleaned data object, the mechanism can operate as a decision tree, inspecting flags within the data object to know which path to put the virtual machine down. If the flags do not serve to differentiate between which path to go down, the flags instead impact the ease of containerization score for the virtual machine. All flags that do not differentiate the path are taken into account within the final step, with point values being added and subtracted from the initial ease of containerization score of 3 assigned to the virtual machine, with all flags carrying an equal impact upon the score.

Figure 9:
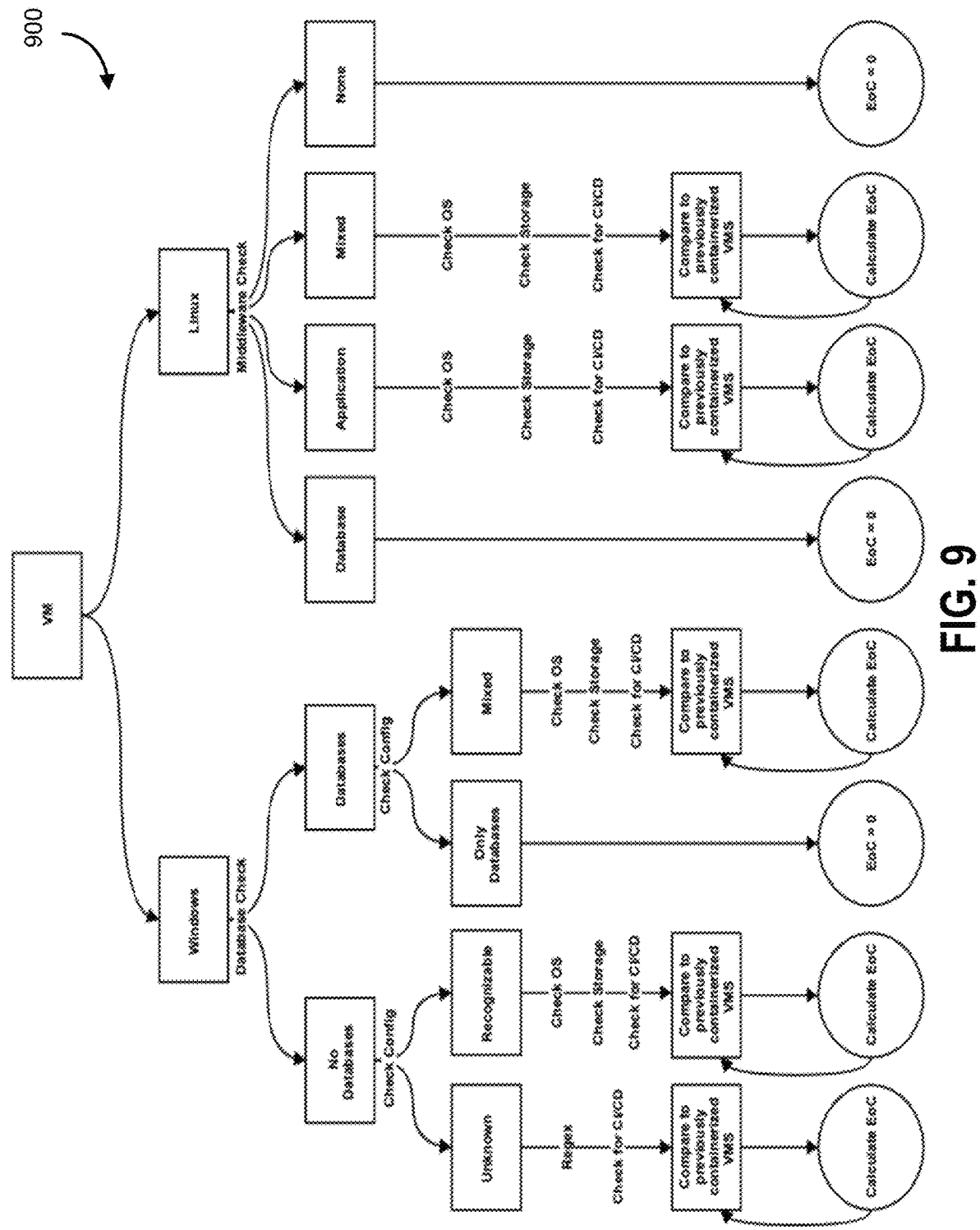
FIG. 9 is a diagram of a variant of the scoring mechanism, according to some embodiments. It is a decision tree that inspects the data associated to each virtual machine, and proceeds to inspect and score the virtual machine based on its characteristics. However, the final step involves modifying the the score according to the model built by the machine learning mechanism, as the machine learning mechanism would have discovered correlations between data points and higher or lower ease of containerization scores, thanks to training data provided by the ones performing the conversions.

FIG. 9 is a diagram 900 depicting the desired future state of the ease of containerization scoring mechanism. This mechanism is still able to function as a decision tree to determine whether a virtual machine is or is not capable of being containerized, but has the added benefit of using machine learning to assign more accurate weights to each flag taken into account during the final step, resulting in more accurate ease of containerization scores.

Figure 10:
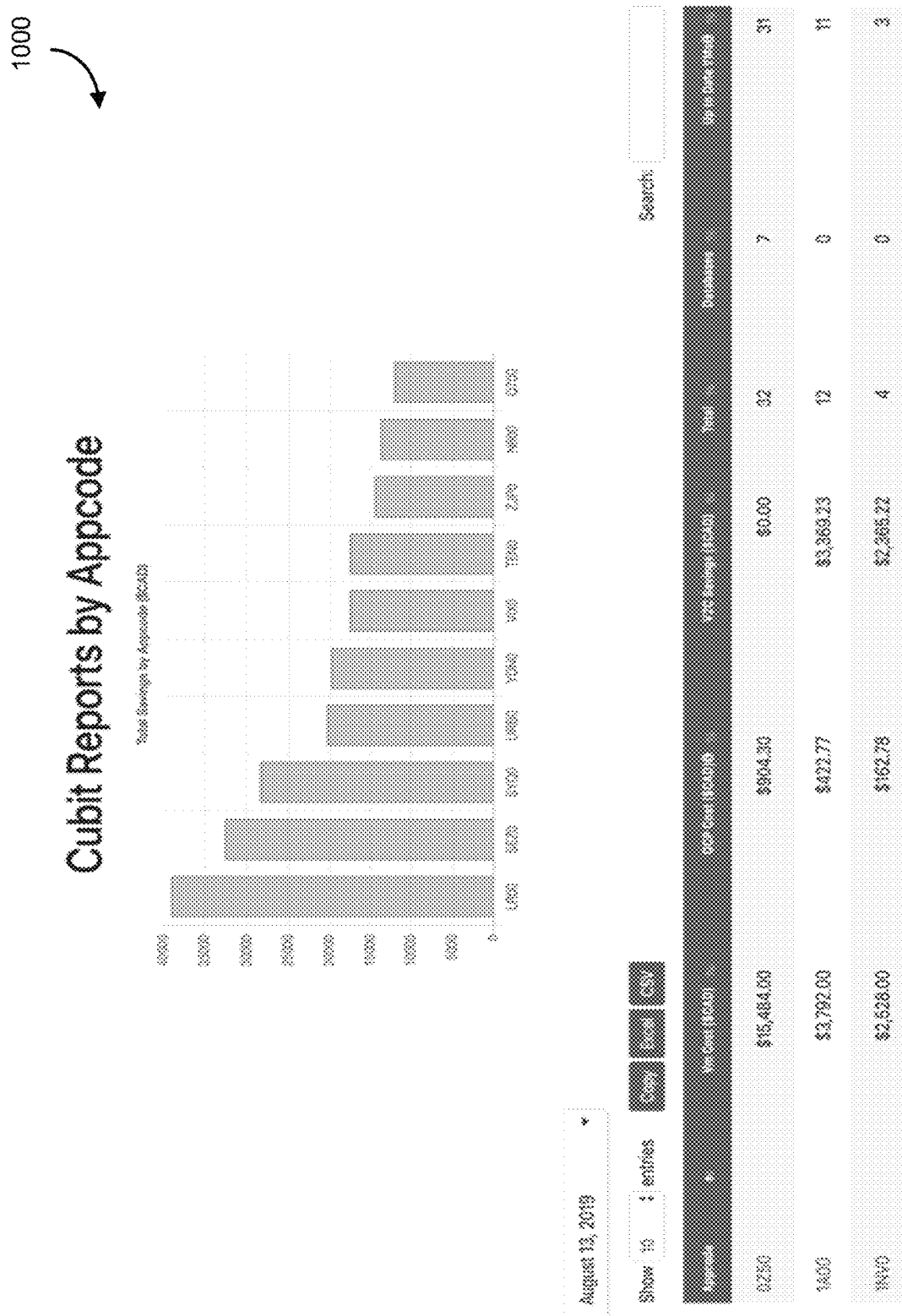
FIG. 10 is a screenshot of a graphical user interface (UI), showing a graph of the top 10 containerizable applications with the greatest savings, as well as a brief portion of the table of all applications that exist.

FIG. 10 is a picture 1000 of the application level view within the user interface, showing an interactive graph of the 10 applications with the greatest savings by switching the application from running on virtual machines to running on containers. A brief portion of a table is visible.

Figure 11:
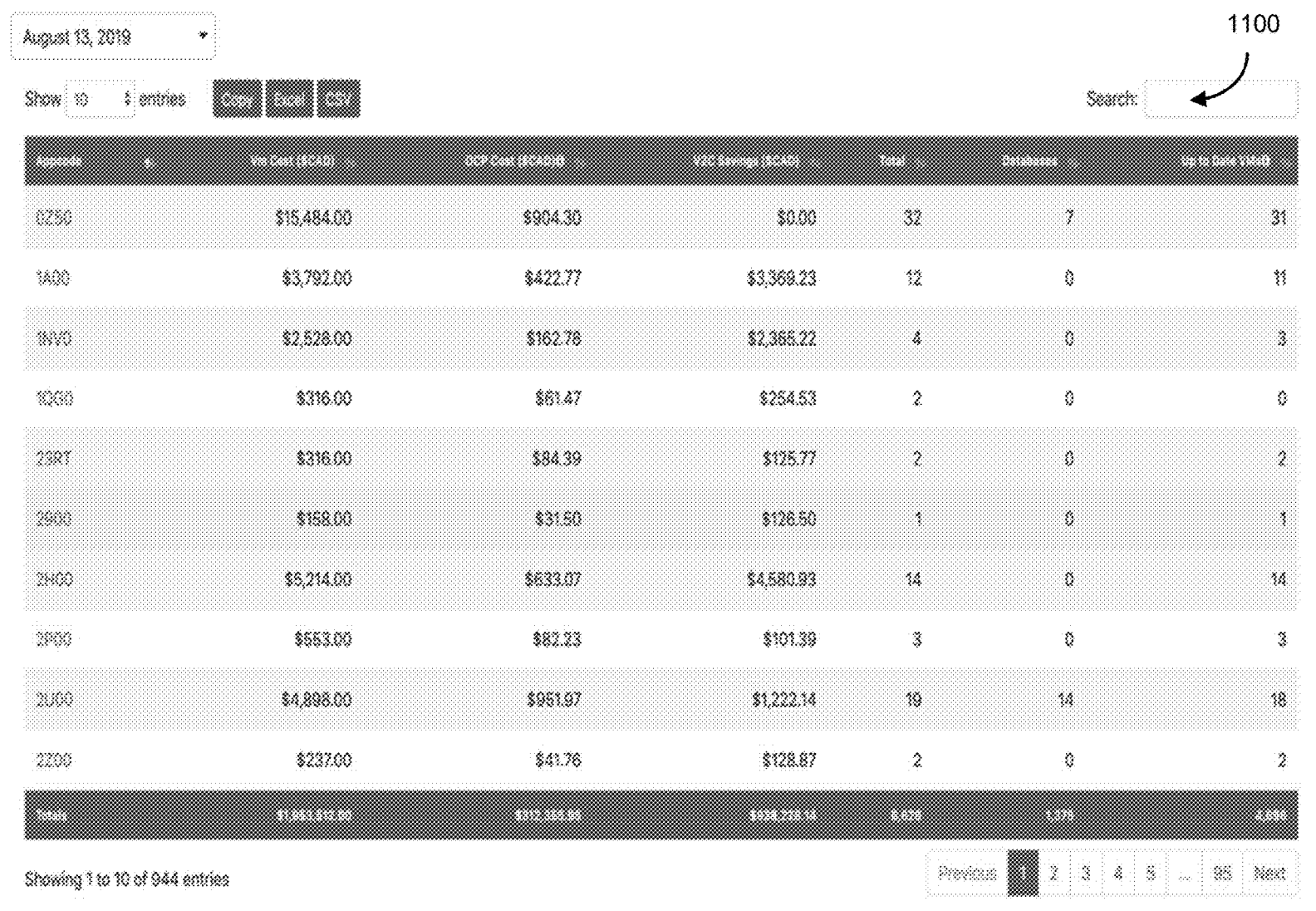

FIG. 11 is a picture 1100 of the application level view within the user interface, specifically the table mentioned in the previous paragraph.

This table shows the name of the application, the operating cost to run that application on virtual machines, the operating cost to run that application on containers, the monthly savings that could be realized by converting to container computing, the total number of virtual machines within the application, the total number of virtual machines within the application that are databases (and thus should not be converted to containers due to the heavy use of disk data storage), and number of virtual machines with up-to-date operating systems within the application.

This table features the ability to search, the ability to sort on a feature, the ability to download the report in various different formats, and the ability to select a historical report.

Figure 12:
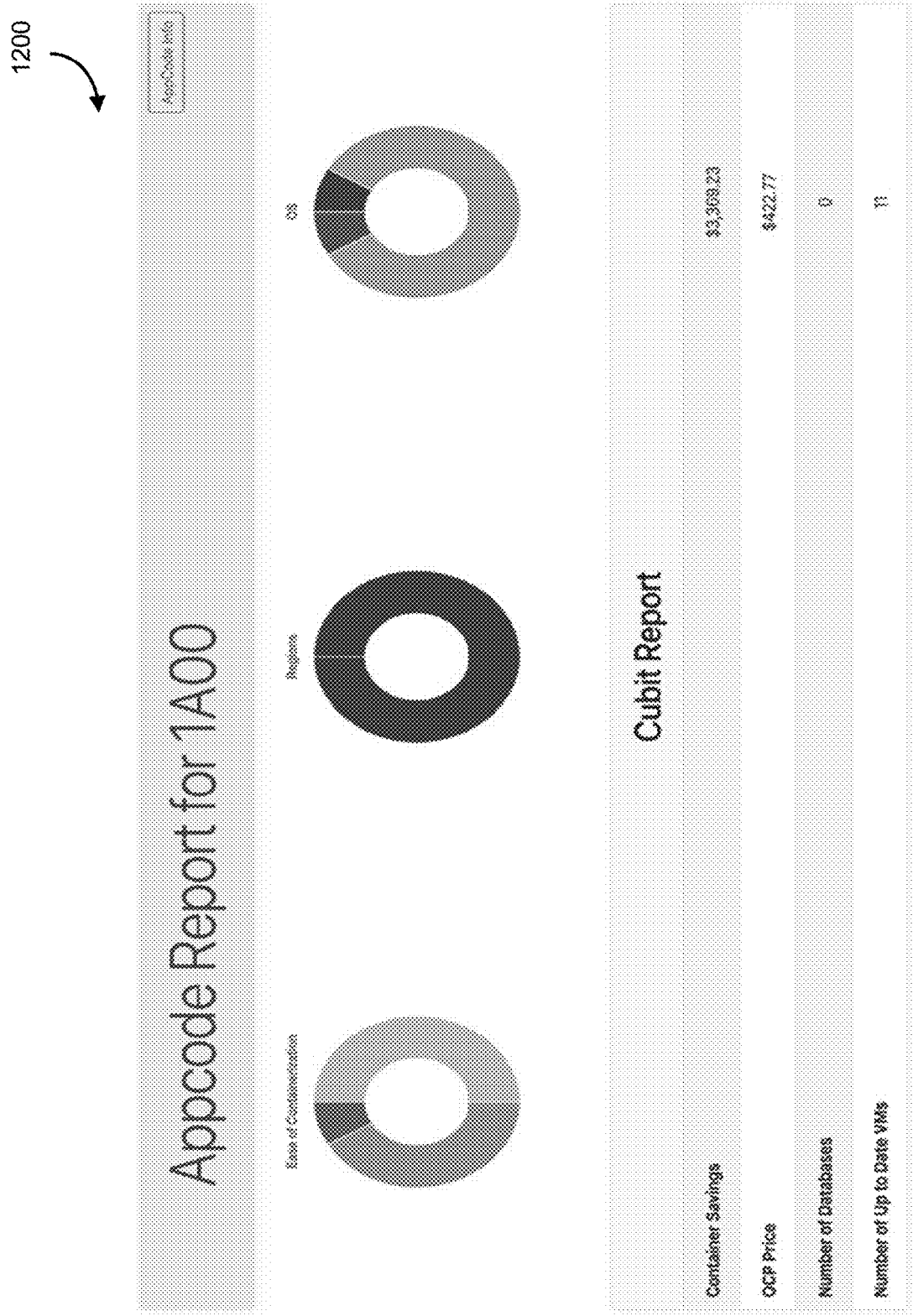
FIG. 12 is a screenshot of the UI, showing some graphs detailing the breakdown of virtual machines within that application, and some brief containerization data associated with that application.

FIG. 12 is a picture 1200 of the user interface, specifically the report for a specific application.

Provided are interactive graphs of the virtual machines within the application broken down by the ease of containerization score, the region within which the virtual machine is located, and the operating system of the virtual machine. Below the interactive graphs is a card containing the monthly savings that could be realized by converting to container computing, the monthly operating cost to run that application on containers, the total number of virtual machines within the application that are databases (and thus should not be converted to containers due to the heavy use of disk data storage), and number of virtual machines with up-to-date operating systems within the application.

Figure 13:
FIG. 13 is a screenshot of the UI, showing a table of all of the virtual machines that form that application, and the associated container data for each virtual machine.

FIG. 13 is a picture 1300 of the user interface, in this case, the table from the application report page. The table includes the name, the ease of containerization score, operating cost, container operating cost, container conversion savings, whether the virtual machine is a database, the operating system, whether that operating system is up to date, languages found, databases found, frameworks found, middleware found, services found, other things found, and the location, for every virtual machine within the application. This table features the ability to search, the ability to sort on a feature, the ability to download the report in various different formats, and the ability to select a historical report.

Figure 14:
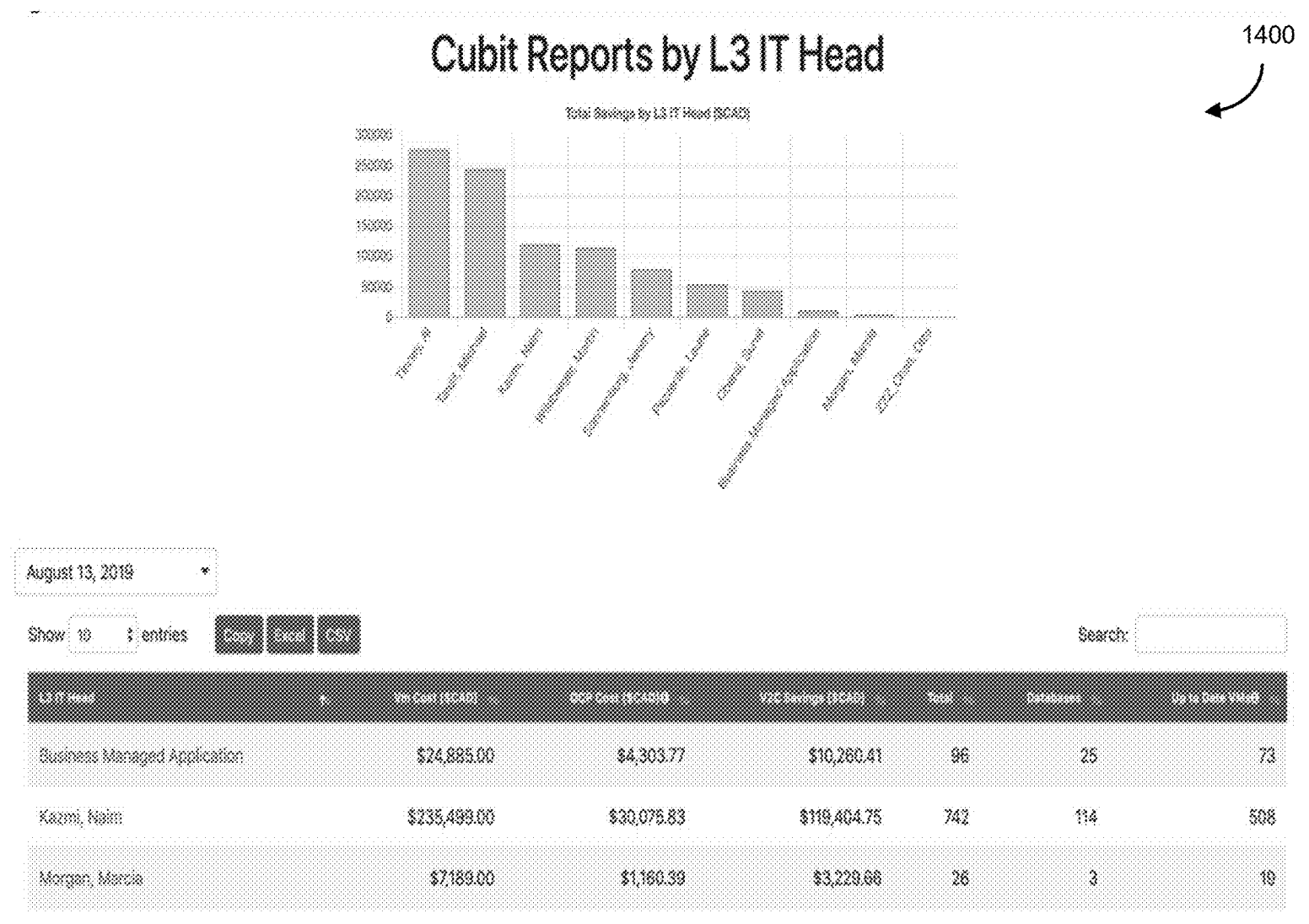

FIG. 14 is a picture 1400 of the executive level view within the user interface, showing an interactive graph of the 10 executives with the greatest savings by switching the applications that they oversee currently running on virtual machines to running on containers. A brief portion of a table is visible.

Figure 15:
FIG. 15 is a screenshot of the UI, showing a table of all of the executives, and the associated containerization data for the applications overseen by each executive.

FIG. 15 is a picture 1500 of the executive level view within the user interface, specifically the table mentioned in the previous paragraph. This table shows you the name of the executive, the operating cost to run the applications they oversee on virtual machines, the operating cost to run those applications on containers, the monthly savings that could be realized by converting to container computing, the total number of virtual machines that they oversee, the total number of virtual machines that they oversee that are databases (and thus should not be converted to containers due to the heavy use of disk data storage), and number of virtual machines with up-to-date operating systems within the applications that they oversee. This table features the ability to search, the ability to sort on a feature, the ability to download the report in various different formats, and the ability to select a historical report.

Figure 16:
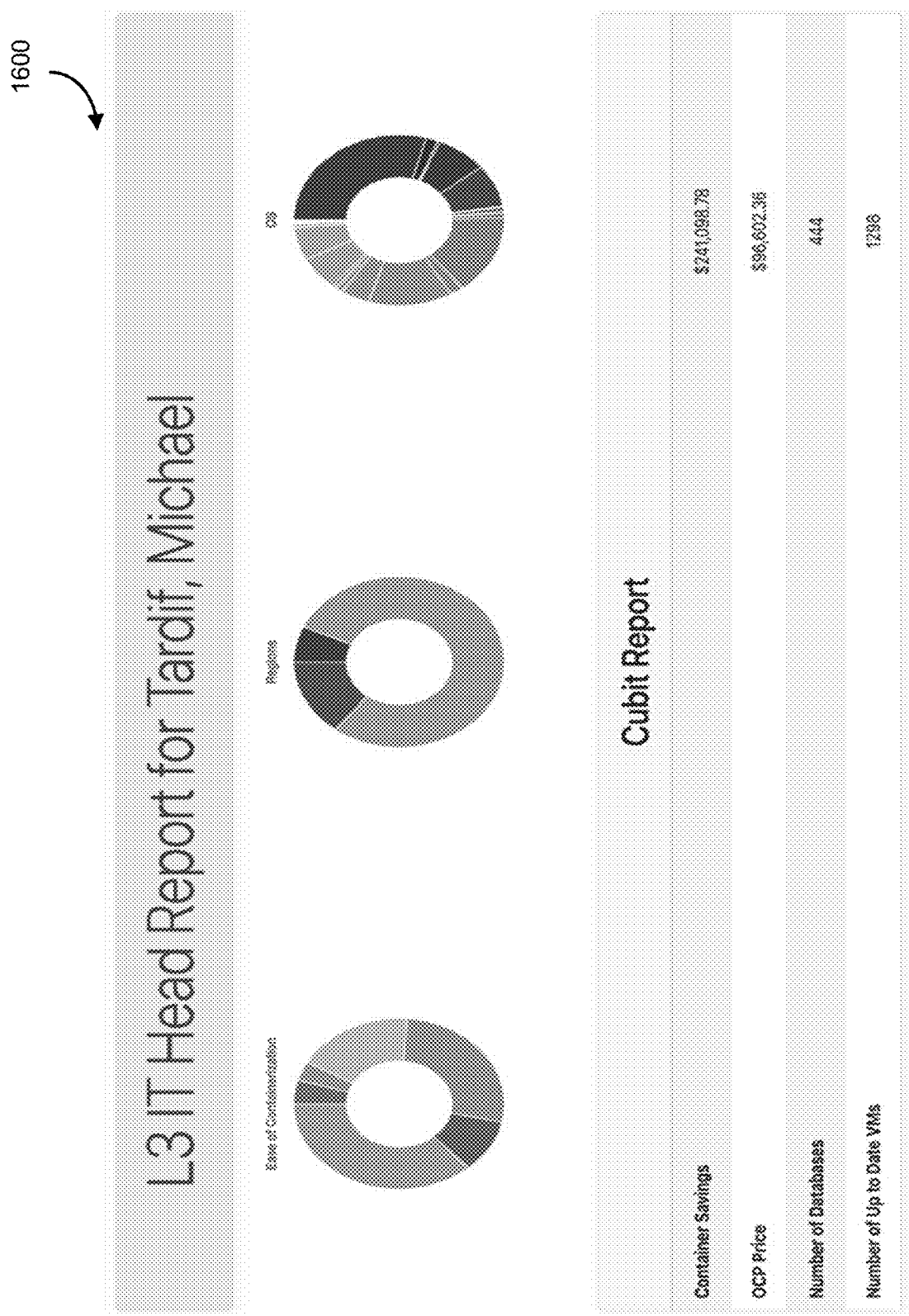
FIG. 16 is a screenshot of the UI, showing some graphs detailing the breakdown of virtual machines overseen by an executive, and some brief containerization data associated with the virtual machines overseen by that executive.

FIG. 16 is a picture 1600 of the user interface, specifically the the report for a specific executive. Provided are interactive graphs of the virtual machines overseen by that particular executive broken down by the ease of containerization score, the region within which the virtual machine is located, and the operating system of the virtual machine. Below the interactive graphs is a card containing the monthly savings that could be realized by converting to container computing, the monthly operating cost to run that all of the overseen virtual machines on containers, the total number of virtual machines overseen by the executive that are databases (and thus should not be converted to containers due to the heavy use of disk data storage), and number of virtual machines with up-to-date operating systems overseen by the executive.

FIG. 17 is a picture 1700 of the user interface, in this case, the table from the executive report page. The table includes the name, the ease of containerization score, operating cost, container operating cost, container conversion savings, whether the virtual machine is a database, the operating system, whether that operating system is up to date, languages found, databases found, frameworks found, middleware found, services found, other things found, and the location, for every virtual machine overseen by the executive. This table features the ability to search, the ability to sort on a feature, the ability to download the report in various different formats, and the ability to select a historical report.

Figure 18:
FIG. 18 is a screenshot of the UI, showing a table of all of the virtual machines that exist within the virtual real estate, and the associated container data.

FIG. 18 is a picture 1800 of the user interface, in this case, the table from the virtual machine report page. The table includes the name, the ease of containerization score, appcode with which the virtual machine belongs to, operating cost, container operating cost, container conversion savings, whether the virtual machine is a database, the operating system, whether that operating system is up to date, languages found, databases found, frameworks found, middleware found, services found, other things found, and the location, for every virtual machine within the virtual real estate. This table features the ability to search, the ability to sort on a feature, the ability to download the report in various different formats, and the ability to select a historical report.

Figure 19:
FIG. 19 is a screenshot of the UI, showing a virtual machine specific card of the containerization data associated with that virtual machine.

FIG. 19 is a picture 1900 of the user interface, specifically the card containing an individual virtual machine's containerization information. This includes the ease of containerization score for that virtual machine, the cost to run that virtual machine on a container, the savings that would occur of the virtual machine were to be replaced with a container, whether that virtual machine is a database, the virtual machine's operating system, and whether or not the virtual machine's operating system is up-to-date.

Figure 20:
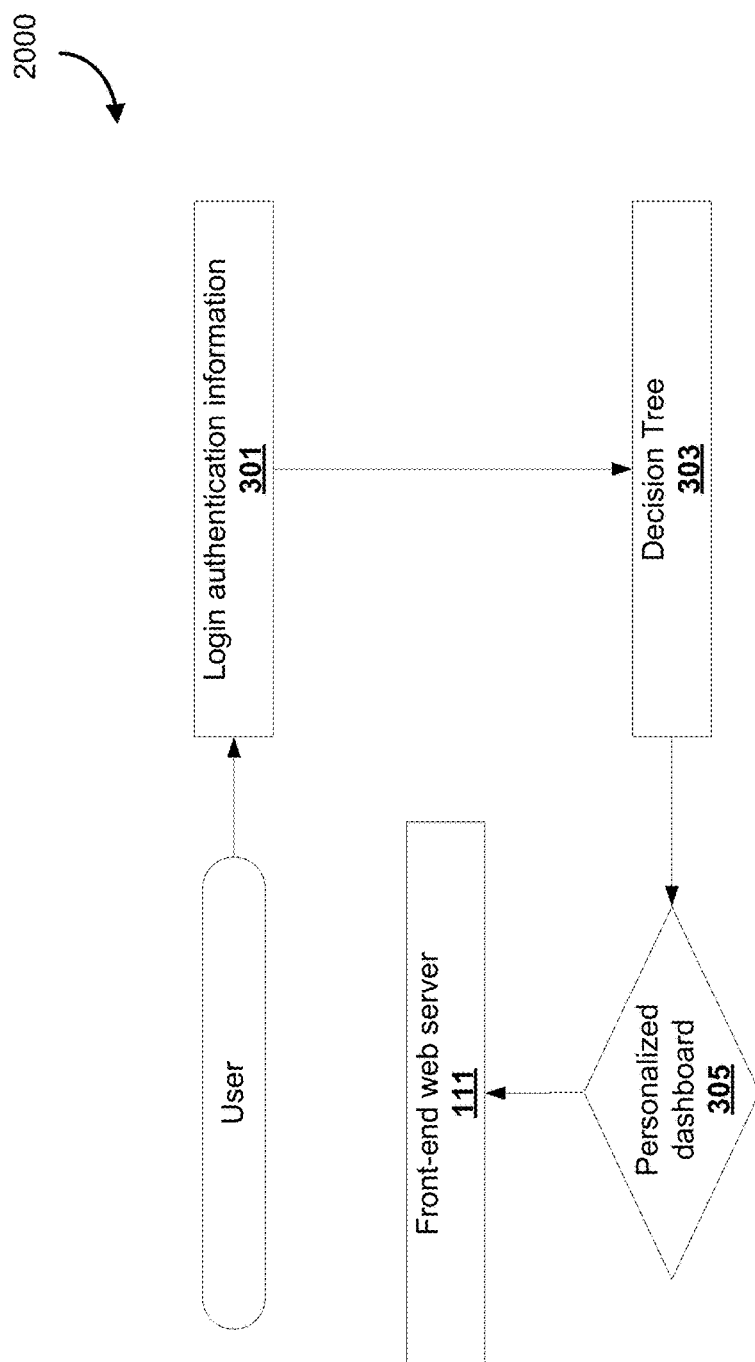
FIG. 20 is a schematic diagram of the front-end web server, according to some embodiments.

FIG. 20 is a schematic diagram 2000 of the front-end web server 111, according to some embodiments.

Using the inference and components of the aggregated data as explained above, the tool calculates potential cost savings and ease of containerization and provides a recommendation on whether an appcode should containerize. A front-end web server 111 displays this result in a personalized format dependent on a user's login authentication information 301.

In some embodiments, the front-end web server 111 may be made with bootstrap and primarily datatable.net (a JavaScript editor). When a user logs into their account using their login authentication information 301 (a username and password), the tool accesses an active directory system such as LDAP™ and finds the name of the user based on username. The tool then uses a decision tree 303 to associate all the applications for a particular user. When that user logs in, the dashboards in the website will be a personalized dashboard 305 that only shows the user's applications. In some embodiments, an additional dashboard may be available in which the associated applications will be grouped by team member, where the user is a group. In other embodiments, the dashboard may provide the user with a view of associated applications grouped by the sub-users that the primary user oversees, allowing for easier allocation of responsibility to and between the sub-users.

Figure 21:
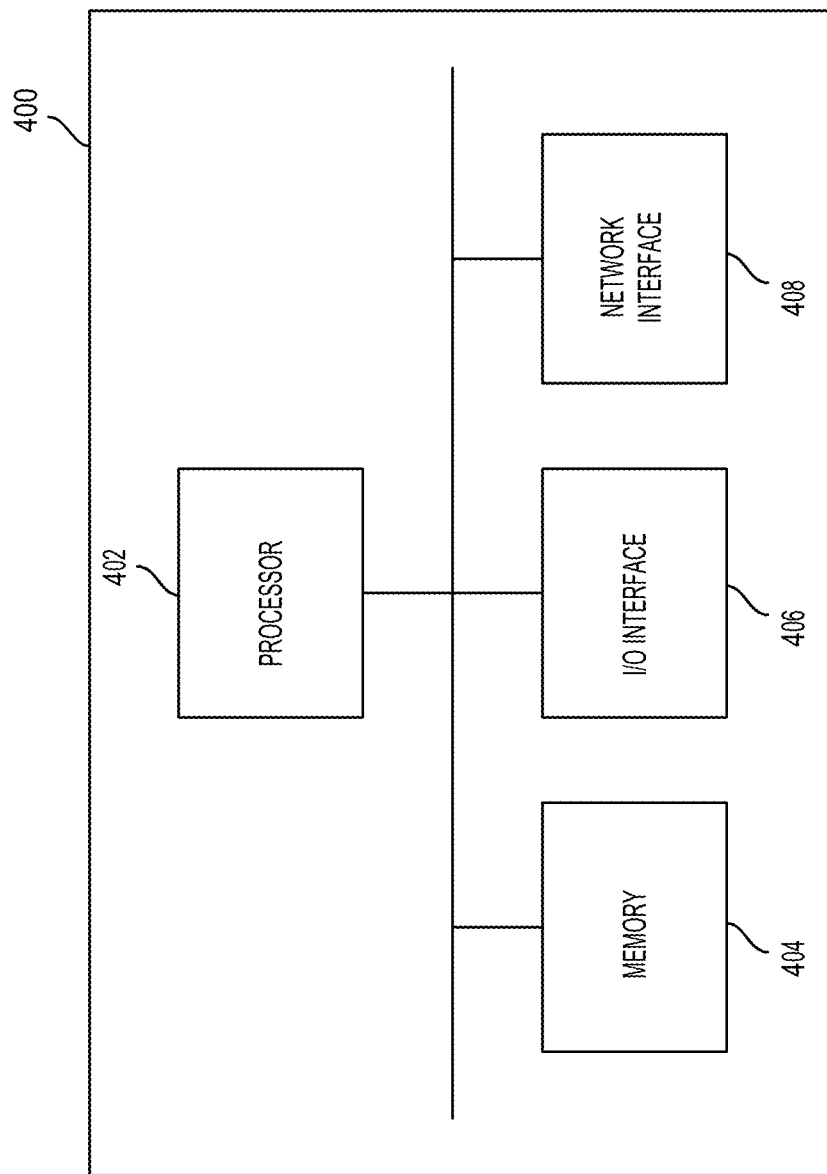
FIG. 21 is an example computing system diagram, according to some embodiments.

FIG. 21 is a schematic diagram of a computing device 400 such as a server. As depicted, the computing device includes at least one processor 402, memory 404, at least one I/O interface 406, and at least one network interface 408.

Processor 402 may be an Intel or AMD x86 or x64, PowerPC, ARM processor, or the like. Memory 404 may include a suitable combination of computer memory that is located either internally or externally such as, for example, random-access memory (RAM), read-only memory (ROM), compact disc read-only memory (CDROM).

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

Computing device 400 is operable to register and authenticate users (using a login, unique identifier, and password for example) prior to providing access to applications, a local network, network resources, other networks and network security devices. Computing devices 400 may serve one user or multiple users.

Figure 22:
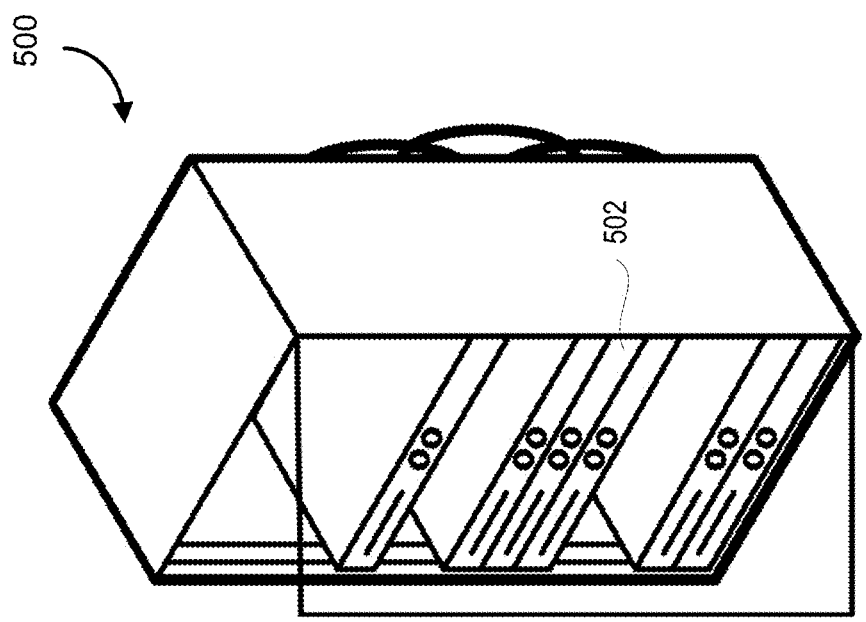
FIG. 22 is a diagram of a special purpose computer server, according to some embodiments.

FIG. 22 is an illustration of a special purpose machine 502, according to some embodiments that may reside at data center. The special purpose machine 502, for example, incorporates the features of the system 100 and is provided in a portable computing mechanism that, for example, may be placed into a data center as a rack server or rack server component that interoperates and interconnects with other devices, for example, across a network or a message bus.

The special purpose machine 502, in some embodiments, is a cloud controller that is configured to (i) identify virtual machine instances that are candidates for containerization, and (ii) control the transition to containers from existing virtual machine instances.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for determining a subset of candidate virtual machine computing instances for transition into container-based computing instances from a set of virtual machine computing instances, the system comprising:

a processor and computer memory, the processor configured to:
receive one or more data sets representing (i) characteristics of operation of each of virtual machine computing instance of the set of virtual machine computing instances, the one or more data sets including at least one of processor usage, memory usage, or network usage, and (ii) an integrated development environment (IDE) of each virtual machine computing instance;
process the one or more data sets to output a metric representative of a relative ease of containerization for each virtual machine computing instance;
generate a data structure storing a subset of candidate virtual machine computing instances determined based on the one or more virtual machine computing instances having a metric greater than a predefined threshold;
segment the subset of candidate virtual machine computing instances into one or more container groups each corresponding to one or more container devices, each container device having a shared operating system shared across all containers associated with the container group hosted by the container device;
wherein the data structure is processed by a downstream computing process for transitioning the subset of candidate virtual machine computing instances to be hosted on one or more corresponding container devices based on the identified one or more container groups; and
wherein the segmenting of the subset of candidate virtual machine computing instances into one or more container groups each corresponding to one or more container devices is based at least on an estimated resource requirement of the corresponding candidate virtual machine instance determined based at least one the IDE of the corresponding candidate virtual machine instance.

2. The system of claim 1, wherein the data structure stores the data field representations of the subset of candidate virtual machine computing instances in a prioritized order based on a corresponding metric representative of a relative ease of containerization, the prioritized order; and
wherein the transitioning of the subset of candidate virtual machine computing instances to be hosted on one or more corresponding container devices is conducted in the prioritized order.

3. The system of claim 1, wherein the processing the one or more data sets to output the metric representative of the relative ease of containerization for each virtual machine computing instance includes using one or more regular expression strings.

4. The system of claim 1, wherein the processing the one or more data sets to output the metric representative of the relative ease of containerization for each virtual machine computing instance includes using a machine learning data architecture configured to process the one or more data sets using a maintained unsupervised machine learning model based at least on one or more chargeback models representing cost savings.

5. The system of claim 4, wherein the processing the one or more data sets to output a metric representative of a relative ease of containerization for each virtual machine computing instance includes inferring a role of virtual machine based on the IDE of the virtual machine computing instance.

6. The system of claim 1, wherein the transmitting of the control signals for transitioning the subset of candidate virtual machine computing instances includes provisioning the one or more container devices and the corresponding shared operating systems.

7. The system of claim 1, wherein the segmenting of the subset of candidate virtual machine computing instances into one or more container groups each corresponding to one or more container devices is based at least on an inferred role of the corresponding candidate virtual machine instance determined based at least on the IDE of the corresponding candidate virtual machine instance.

8. A method for determining a subset of candidate virtual machine computing instances for transition into container-based computing instances from a set of virtual machine computing instances, the method comprising:
receiving one or more data sets representing (i) characteristics of operation of each of virtual machine computing instance of the set of virtual machine computing instances, the one or more data sets including at least one of processor usage, memory usage, or network usage, and (ii) an integrated development environment (IDE) of each virtual machine computing instance;
processing the one or more data sets to output a metric representative of a relative ease of containerization for each virtual machine computing instance;
generating a data structure storing a subset of candidate virtual machine computing instances determined based on the one or more virtual machine computing instances having a metric greater than a predefined threshold;
segmenting the subset of candidate virtual machine computing instances into one or more container groups each corresponding to one or more container devices, each container device having a shared operating system shared across all containers associated with the container group hosted by the container device;
wherein the data structure is processed by a downstream computing process for transitioning the subset of candidate virtual machine computing instances to be hosted on one or more corresponding container devices based on the identified one or more container groups; and
wherein the segmenting of the subset of candidate virtual machine computing instances into one or more container groups each corresponding to one or more container devices is based at least on an estimated resource requirement of the corresponding candidate virtual machine instance determined based at least one the IDE of the corresponding candidate virtual machine instance.

9. The method of claim 8, wherein the data structure stores the data field representations of the subset of candidate virtual machine computing instances in a prioritized order based on a corresponding metric representative of a relative ease of containerization, the prioritized order; and
wherein the transitioning of the subset of candidate virtual machine computing instances to be hosted on one or more corresponding container devices is conducted in the prioritized order.

10. The method of claim 8, wherein the processing the one or more data sets to output the metric representative of the relative ease of containerization for each virtual machine computing instance includes using one or more regular expression strings.

11. The method of claim 8, wherein the processing the one or more data sets to output the metric representative of the relative ease of containerization for each virtual machine computing instance includes using a machine learning data architecture configured to process the one or more data sets using a maintained unsupervised machine learning model based at least on one or more chargeback models representing cost savings.

12. The method of claim 11, wherein the processing the one or more data sets to output a metric representative of a relative ease of containerization for each virtual machine computing instance includes inferring a role of virtual machine based on the IDE of the virtual machine computing instance.

13. The method of claim 8, wherein the transmitting of the control signals for transitioning the subset of candidate virtual machine computing instances includes provisioning the one or more container devices and the corresponding shared operating systems.

14. The method of claim 8, wherein the segmenting of the subset of candidate virtual machine computing instances into one or more container groups each corresponding to one or more container devices is based at least on an inferred role of the corresponding candidate virtual machine instance determined based at least on the IDE of the corresponding candidate virtual machine instance.

15. A non-transitory computer readable storing machine interpretable instructions, which when executed by a processor, cause the processor to execute a method for determining a subset of candidate virtual machine computing instances for transition into container-based computing instances from a set of virtual machine computing instances, the method comprising:

receiving one or more data sets representing (i) characteristics of operation of each of virtual machine computing instance of the set of virtual machine computing instances, the one or more data sets including at least one of processor usage, memory usage, or network usage, and (ii) an integrated development environment (IDE) of each virtual machine computing instance;

processing the one or more data sets to output a metric representative of a relative ease of containerization for each virtual machine computing instance;

generating a data structure storing a subset of candidate virtual machine computing instances determined based on the one or more virtual machine computing instances having a metric greater than a predefined threshold;

segmenting the subset of candidate virtual machine computing instances into one or more container groups each corresponding to one or more container devices, each container device having a shared operating system shared across all containers associated with the container group hosted by the container device;

wherein the data structure is processed by a downstream computing process for transitioning the subset of candidate virtual machine computing instances to be hosted on one or more corresponding container devices based on the identified one or more container groups; and wherein the segmenting of the subset of candidate virtual machine computing instances into one or more container groups each corresponding to one or more container devices is based at least on an estimated resource requirement of the corresponding candidate virtual machine instance determined based at least on the IDE of the corresponding candidate virtual machine instance.

* * * * *